(12) United States Patent
Zhang et al.

(10) Patent No.: US 10,882,990 B2
(45) Date of Patent: Jan. 5, 2021

(54) MULTI-FUNCTIONALLY MODIFIED POLYMER BINDER FOR LITHIUM ION BATTERIES AND USE THEREOF IN ELECTROCHEMICAL ENERGY STORAGE DEVICES

(71) Applicant: GUANGZHOU INSTITUTE OF ENERGY CONVERSION, CHINESE ACADEMY OF SCIENCES, Guangzhou (CN)

(72) Inventors: Lingzhi Zhang, Guangzhou (CN); Jiarong He, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 158 days.

(21) Appl. No.: 16/313,474

(22) PCT Filed: Sep. 8, 2016

(86) PCT No.: PCT/CN2016/098379
§ 371 (c)(1),
(2) Date: Dec. 27, 2018

(87) PCT Pub. No.: WO2018/000579
PCT Pub. Date: Jan. 4, 2018

(65) Prior Publication Data
US 2019/0225792 A1    Jul. 25, 2019

(30) Foreign Application Priority Data

Jun. 28, 2016 (CN) .......................... 2016 1 0508351

(51) Int. Cl.
*C08F 251/02* (2006.01)
*C08F 255/10* (2006.01)
(Continued)

(52) U.S. Cl.
CPC ............ *C08L 51/02* (2013.01); *C08F 220/18* (2013.01); *C08F 220/56* (2013.01);
(Continued)

(58) Field of Classification Search
None
See application file for complete search history.

(56) References Cited

U.S. PATENT DOCUMENTS 3,882,057 A * 5/1975 Lindenfors ............ C09J 151/02
524/13
4,322,472 A 3/1982 Kaspar et al.
2015/0380719 A1* 12/2015 Zhang ................... C09J 105/08
429/217

FOREIGN PATENT DOCUMENTS

CN    102031078 A    4/2011
CN    103788905 A    5/2014
(Continued)

*Primary Examiner* — Richard A Huhn
(74) *Attorney, Agent, or Firm* — Bayramoglu Law Offices LLC

(57) ABSTRACT

A multi-functionally modified polymer binder for lithium ion batteries, which is prepared by a free radical graft copolymerization or a Michael addition reaction, with a biomass polymer or a synthetic polymer as a substrate, and a hydrophilic monomer and a lipophilic monomer as functionally modifying monomers. The binder presents a three-dimensional network body with a multi-branch structure, provides more active cites for contacting with the electrode active materials, improves uniformity and flatness in the formation of films from electrode slurry, enhances the binding strength between the electrode active materials, the conductive agents and the current collector, has high elasticity and binding strength, and is applicable in water/organic solvent. Use of the binder in positive electrodes and negative electrodes can facilitate the conduction of elec- (Continued)

trons/ions during charging and discharging, reduce the electrochemical interface impedance of the electrodes.

5 Claims, 8 Drawing Sheets

(51) Int. Cl.
| | |
|---|---|
| *C08F 283/06* | (2006.01) |
| *C08F 220/06* | (2006.01) |
| *C08F 220/56* | (2006.01) |
| *C08F 212/08* | (2006.01) |
| *C08F 218/08* | (2006.01) |
| *C08F 220/14* | (2006.01) |
| *C08F 220/44* | (2006.01) |
| *C08F 220/54* | (2006.01) |
| *C08F 236/06* | (2006.01) |
| *H01M 4/62* | (2006.01) |
| *C08L 51/02* | (2006.01) |
| *C09J 151/00* | (2006.01) |
| *C09J 151/02* | (2006.01) |
| *C09J 105/16* | (2006.01) |
| *C08F 220/18* | (2006.01) |
| *C08K 3/28* | (2006.01) |
| *C08K 3/30* | (2006.01) |
| *C08K 5/23* | (2006.01) |
| *C08L 47/00* | (2006.01) |
| *C08L 71/02* | (2006.01) |
| *C08L 79/02* | (2006.01) |
| *H01M 10/0525* | (2010.01) |
| *C08L 1/28* | (2006.01) |

(52) U.S. Cl.
CPC .............. *C08F 251/02* (2013.01); *C08K 3/28* (2013.01); *C08K 3/30* (2013.01); *C08K 5/23* (2013.01); *C08L 47/00* (2013.01); *C08L 71/02* (2013.01); *C08L 79/02* (2013.01); *C09J 105/16* (2013.01); *C09J 151/00* (2013.01); *C09J 151/02* (2013.01); *H01M 4/622* (2013.01); *H01M 10/0525* (2013.01); *C08F 212/08* (2013.01); *C08F 218/08* (2013.01); *C08F 220/54* (2013.01); *C08F 236/06* (2013.01); *C08F 255/10* (2013.01); *C08F 283/06* (2013.01); *C08K 2003/285* (2013.01); *C08K 2003/3045* (2013.01); *C08L 1/286* (2013.01); *Y02E 60/10* (2013.01)

(56) References Cited

FOREIGN PATENT DOCUMENTS

| | | | |
|---|---|---|---|
| CN | 105131875 A | | 12/2015 |
| CN | 105261759 A | | 1/2016 |
| CN | 105504169 A | * | 4/2016 |
| CN | 105504169 A | | 4/2016 |
| CN | 105576247 A | | 5/2016 |
| CN | 105914377 A | | 8/2016 |

* cited by examiner

Graphite-Acacia-PAA   Si-Acacia-PAA   LFP-CMC-PAA-PAN   NCM-CMC-PAA-PAN   LFP-CTS-PAA-PAN

10,882,990 B2

MULTI-FUNCTIONALLY MODIFIED POLYMER BINDER FOR LITHIUM ION BATTERIES AND USE THEREOF IN ELECTROCHEMICAL ENERGY STORAGE DEVICES

CROSS REFERENCE TO THE RELATED APPLICATIONS

This application is the national phase entry of International Application No. PCT/CN2016/098379, filed on Sep. 8, 2016, which is based upon and claims priority to Chinese Patent Application No. 201610508351.2, filed on Jun. 28, 2016, the entire contents of which are incorporated herein by reference.

TECHNICAL FIELD

The present invention relates to polymer binders for lithium ion batteries, and particularly relates to a multi-functionally modified polymer binder for lithium ion batteries and use thereof in electrochemical energy storage devices.

BACKGROUND

During battery manufacturing, it is always necessary to use binders to bind the powdery electrode active materials. As an important non-active material in lithium ion batteries, a binder adheres electrode active materials and conductive agents to a current collector, and its performance directly affects electrochemical performance of the battery. In addition to the bonding effect between the electrode active materials, the conductive agents and the current collector, a binder should have sufficient elasticity (preventing the active material particles from swelling and breaking off due to their expansion and contraction during charging and discharging of the battery), facilitate the conduction of electrons and ions during charging and discharging, and reduce the impedance between the current collector and the electrode materials. For a long time, in large-scale production of the lithium ion battery industry, people mainly use polyvinylidene fluoride (PVDF) as a binder and an organic solvent N-methylpyrrolidone (NMP) as a dispersant. However, PVDF has disadvantages; for example, it has poor conductivity for electrons and ions, swells in electrolytes, and will cause an exothermic reaction with metallic lithium and $LixC_6$ in a relatively high temperature, which raise safety risks. In addition, as PVDF exhibits a relatively high Young's modulus, electrodes will exhibit poor flexibility, and show decreases in molecular weight and binding property after absorbing water, resulting in a relatively high humidity requirement of the environment, high energy consumption and high production cost. Accordingly, to develop a novel green binder (which has high dispersibility and sufficient binding strength, and can facilitate the conduction of electrons and ions) to replace PVDE is of great significance, and has gradually become an important trend of in the development of lithium ion battery binders in order to meet the needs of modern society for green energy-saving production. At present, water-based binders have binding strengths far poorer than those of commercial PVDF organic system, and thus improving the binding strengths of water-based binders is one of the technical challenges that need to be overcome.

Developing water-based binders and improving their binding strengths is one important trend in the development of binders for lithium ion batteries. Styrene-butadiene rubber (SBR)/sodium carboxymethyl cellulose (CMC) and polyacrylates water-based binders already have extensively commercial applications; however, their binding strengths, their capacities of preventing the swelling of the electrodes, and flatness of the electrodes are limited, thus their applications are somewhat limited. The water-based binders for lithium ion batteries can be prepare by copolymerization of styrene monomers and acrylate monomers with PVA as an emulsifier (CN105261759A), but polystyrene has disadvantages such as being brittle and prone to stress cracking, low impact strength, and poor heat resistance. The water-based binders for lithium ion batteries can also be prepared by modification of marine polysaccharide polymers, such as copolymerization of chitosan with acrylic monomers or acrylate monomers (CN105576247A); however, the binders show poor intrinsic binding strength and poor elasticity, and there is a need to further improve the uniformity and flatness of the electrodes. Therefore, to develop a novel multi-functionally water-based binder for lithium ion batteries in order to improve the binding performance and further improve battery performance, and reduce production costs, especially for the positive electrodes, is a current hot topic. Biomass polymers, such as sodium carboxymethyl cellulose and arabic gum, have shown potential advantages as water-based binders for lithium ion batteries, but there is still a need to further improve their binding strengths, dispersibilities, viscosities, elasticities and electrochemical properties. Thus, it is of great significance to perform functional modifications on the polymers to improve their binding properties for electrodes of lithium ion batteries.

SUMMARY

In view of the deficiencies of the prior art, one object of the present invention is to provide a multi-functionally modified polymer binder for lithium ion batteries. The binder has high elasticity and binding strength, is applicable in water/organic solvent, presents a three-dimensional network body with a multi-branch structure, and provides more active cites for contacting with the electrode active materials. Use of the binder in positive electrodes and negative electrodes can improve uniformity and flatness in the formation of films from electrode slurry and enhance the binding strength between the electrode active materials, the conductive agents and the current collector, greatly increase ion conduction rate in the electrolyte, facilitate the conduction of electrons/ions during charging and discharging, reduce the electrochemical interface impedance of the electrodes, largely improve high-rate performances and cycling stabilities of positive and negative electrode materials for lithium batteries, and prevent the materials from breaking off, without causing battery capacity reduction, and thereby it can effectively extend battery life. Moreover, raw materials of the binder can be obtained from wide variety of sources, which significantly reduces the cost. Accordingly, the binder has a promising market potential. In addition, when preparing the multi-functionally modified polymer binder of the present invention, the functional monomers can be controllably introduced to the polymer substrates through a Michael addition reaction, so that the prepared binder products have stable and uniform quality and good comprehensive performances.

The present invention is achieved by the following technical solutions.

Provided is a multi-functionally modified polymer binder for lithium ion batteries, which is prepared by a free radical graft copolymerization or a Michael addition reaction, with a biomass polymer or a synthetic polymer as a substrate, and a hydrophilic monomer and a lipophilic monomer as functionally modifying monomers. The binder has a molecular weight of 10000-1500000, a solids content of 1-50 wt % and a viscosity of 1-50000 mPa·s. The biomass polymer is selected from one or more of arabic gum, cyclodextrin, cellulose derivative, xanthan gum, pectin, gelatin, starch, and sesbania gum; the synthetic polymer is selected from one or more of polyethyleneimine, polyethylene glycol and polyhydroxy polybutadiene; the hydrophilic monomer is selected from at least one of monomers having a structure of $CH_2=CR_1R_2$, wherein $R_1$ is selected from —H, —$CH_3$ and —$CH_2CH_3$, and $R_2$ is selected from —COOH, —COOM (wherein M is a alkali metal such as Li, Na or K) and —$CONH_2$; the lipophilic monomer is selected from at least one of monomers having a structure of $CH_2=CR_3R_4$, wherein $R_3$ is selected from —H, —$CH_3$ and —$CH_2CH_3$, and $R_4$ is selected from at least one of —CN, —$OCOCH_3$, —$CONHCH_3$, —$CON(CH_3)_2$, —$CH=CH_2$, -Ph-$R_5$ (wherein $R_5$ is —H or any substituent other than —H) and —$COOR_6$ (wherein $R_6$ is selected from at least one of C1-C8 alkyl groups); a weight ratio of the biomass polymer or the synthetic polymer, the hydrophilic monomer and the lipophilic monomer is 1:0-100:0-100.

Preferably, the weight ratio of the biomass polymer or the synthetic polymer, the hydrophilic monomer and the lipophilic monomer is 1:0.01-20:0.01-20.

The free radical graft copolymerization refers to a free radical polymerization/copolymerization grafting reaction of the biomass polymer/synthetic polymer with one or more of the hydrophilic monomers and the lipophilic monomers which is initiated by a initiator; the initiator is selected from $(NH_4)_2S_2O_8$, $Na_2S_2O_8$, $K_2S_2O_8$, $(NH_4)_2S_2O_8/NaHSO_3$, $(NH_4)_2S_2O_8/Na_2SO_3$, $Na_2S_2O_8/NaHSO_3$, $Na_2S_2O_8/Na_2SO_3$, $K_2S_2O_8/NaHSO_3$, $K_2S_2O_8/Na_2SO_3$, $Ce(NH_4)_2(NO_3)_6$, and 2,2'-azobis[2-methylpropionamidine] dihydrochloride; an amount of the initiator is 0.01-5 wt % of a total weight of the monomers.

The Michael addition reaction refers to a Michael addition reaction of the biomass polymer/synthetic polymer with one or more of the hydrophilic monomers and the lipophilic monomers through a base catalyst.

Preferably, the base catalyst is selected from one or more of LiOH, NaOH, LiOH/carbamide and NaOH/carbamide; an amount of the base catalyst is 0.01-5 wt % of a total weight of the monomers.

Through the Michael addition reaction, the functional monomers can be controllably introduced to the polymer substrates, so that the prepared binder products have stable and uniform quality and good comprehensive performances.

The cellulose derivative is selected from one or more of sodium carboxymethyl cellulose, sodium hydroxyethyl cellulose, and hydroxypropyl methylcellulose.

The present invention also provides a preparation method of the multi-functionally modified polymer binder for lithium ion batteries, which comprises the following steps:

(1) dissolving the biomass polymer or the synthetic polymer in deionized water, and thoroughly stirring under a protective gas atmosphere for 0.5-2.5 hours to remove oxygen and obtain a solution which is uniform and shows high dispersity; a stirring rate is 100-500 rpm;

(2) adding the initiator or the base catalyst to the solution obtained in step (1), thoroughly stirring to obtain a mixing solution; adding the hydrophilic monomer and the lipophilic monomer to the mixing solution, stirring to allow reaction at 40-90° C. for 1-4 hours to obtain the multi-functionally modified polymer binder for lithium ion batteries; water-solubility and oil-solubility of the binder is regulated by adjusting a mass ratio of the hydrophilic monomer and the lipophilic monomer; the amount of the initiator or the base catalyst is 0.01-5 wt % of the total weight of the monomers; the weight ratio of the biomass polymer or the synthetic polymer, the hydrophilic monomer and the lipophilic monomer is 1:0-100:0-100; the initiator is selected from $(NH_4)_2S_2O_8$, $Na_2S_2O_8$, $K_2S_2O_8$, $(NH_4)_2S_2O_8/NaHSO_3$, $(NH_4)_2S_2O_8/Na_2SO_3$, $Na_2S_2O_8/NaHSO_3$, $Na_2S_2O_8/Na_2SO_3$, $K_2S_2O_8/NaHSO_3$, $K_2S_2O_8/Na_2SO_3$, $Ce(NH_4)_2(NO_3)_6$, and 2,2'-azobis[2-methylpropionamidine] dihydrochloride; and the base catalyst is selected from one or more of LiOH, NaOH, LiOH/carbamide and NaOH/carbamide.

Preferably, in step (1), the protective gas is nitrogen gas or argon gas; the stirring rate is preferably 200-450 rpm.

Preferably, in step (2), the step of stirring to allow reaction is performed at 55° C. Preferably, in step (2), the step of stirring to allow reaction is performed for 2.5 hours. Preferably, the weight ratio of the biomass polymer or the synthetic polymer, the hydrophilic monomer and the lipophilic monomer is 1:0.01-20:0.01-20.

The present invention also protects use of the multi-functionally modified polymer binder for lithium ion batteries in a lithium ion battery positive electrode or negative electrode.

In the use of the multi-functionally modified polymer binder for lithium ion batteries in the lithium ion battery positive electrode, the lithium ion battery positive electrode comprises a current collector and a lithium ion battery positive electrode slurry supported on the current collector; the lithium ion battery positive electrode slurry comprises a positive electrode active material, a conductive agent, the multi-functionally modified polymer binder for lithium ion batteries, and a solvent; a weight ratio of the positive electrode active material, the conductive agent and the multi-functionally modified polymer binder for lithium ion batteries is 70-95:1-20:2.5-10; the solvent is water or an organic solvent (e.g., N-methylpyrrolidone); the positive electrode active material is selected from one or more of lithium iron phosphate, lithium cobaltate, lithium manganate and a ternary material ($LiNi_{1/3}Mn_{1/3}Co_{1/3}O_2$, NMC); the conductive agent is acetylene black; the current collector is an aluminum foil; a solids content of the lithium ion battery positive electrode slurry is 30-75 wt %, and a viscosity of the lithium ion battery positive electrode slurry is 3000-8000 mPa·s.

In the use of the multi-functionally modified polymer binder for lithium ion batteries in the lithium ion battery negative electrode, the lithium ion battery negative electrode comprises a current collector and a lithium ion battery negative electrode slurry supported on the current collector; the lithium ion battery negative electrode slurry comprises a negative electrode active material, a conductive agent, the multi-functionally modified polymer binder for lithium ion batteries, and a solvent; a weight ratio of the negative electrode active material, the conductive agent and the multi-functionally modified polymer binder for lithium ion batteries is 70-95:1-20:2.5-10; the solvent is water or an organic solvent (e.g., N-methylpyrrolidone); the negative electrode active material is selected from one or more of a silicon-based material, lithium titanate or graphite; the conductive agent is acetylene black; the current collector is a copper foil.

The binder can be applied to other electrochemical energy storage devices, such as other secondary batteries, supercapacitors, or solar cells.

The present invention also provides a lithium ion battery. The battery comprises a battery case, an electrode core and an electrolyte; the electrode core and the electrolyte are sealed in the battery case; the electrode core contains electrodes which comprise the multi-functionally modified polymer binder for lithium ion batteries, and a separator between the electrodes.

The present invention has the following advantages.

(1) The multi-functionally modified polymer binder for lithium ion batteries provided by the present invention has high elasticity, binding strength and flexibility, is applicable in water/organic solvent, presents a three-dimensional network body with a multi-branch structure, and provides more active cites for contacting with the electrode active materials, greatly increases ion conduction rate in the electrolyte, facilitates the conduction of electrons/ions during charging and discharging, and reduces the electrochemical interface impedance of the electrodes.

(2) Use of the multi-functionally modified polymer binder in positive electrodes and negative electrodes can improve uniformity and flatness in the formation of films from electrode slurry, enhance the peel strengths of the active materials and the conductive agent to a metal substrate, enhance the binding strength between the electrode active materials, the conductive agents and the current collector, prevents the materials from breaking off, without causing battery capacity reduction, and largely improves high-rate performances and cycling stabilities of the positive and negative electrode materials for lithium batteries, and thereby it can effectively extend battery life.

(3) When preparing the multi-functionally modified polymer binder of the present invention, the functional monomers can be controllably introduced to the polymer substrates through a Michael addition reaction, so that the prepared binder products have stable and uniform quality and good comprehensive performances.

(4) The preparation method for the multi-functionally modified polymer binder of the present invention is simple, convenient, and environment-friendly; the raw materials of the binder can be obtained from wide variety of sources, which significantly reduces the cost, and thus the binder has a promising market potential. Through adjusting the types and ratio of the monomers, the prepared multi-functionally modified polymer binder has high elasticity and binding strength, is applicable in water/organic solvent, presents a three-dimensional network body with a multi-branch structure, provides more active cites for contacting with the electrode active materials, greatly increases ion conduction rate in the electrolyte, and facilitates the conduction of electrons/ions during charging and discharging. The binder can be applied to positive electrodes and negative electrodes of lithium ion batteries, promote the technological advancement of the lithium-ion battery industry and even promote the development of strategic emerging industries such as electric vehicles.

(5) The binder can be applied to other electrochemical energy storage devices, such as other secondary batteries, supercapacitors, or solar cells.

Figure 1:
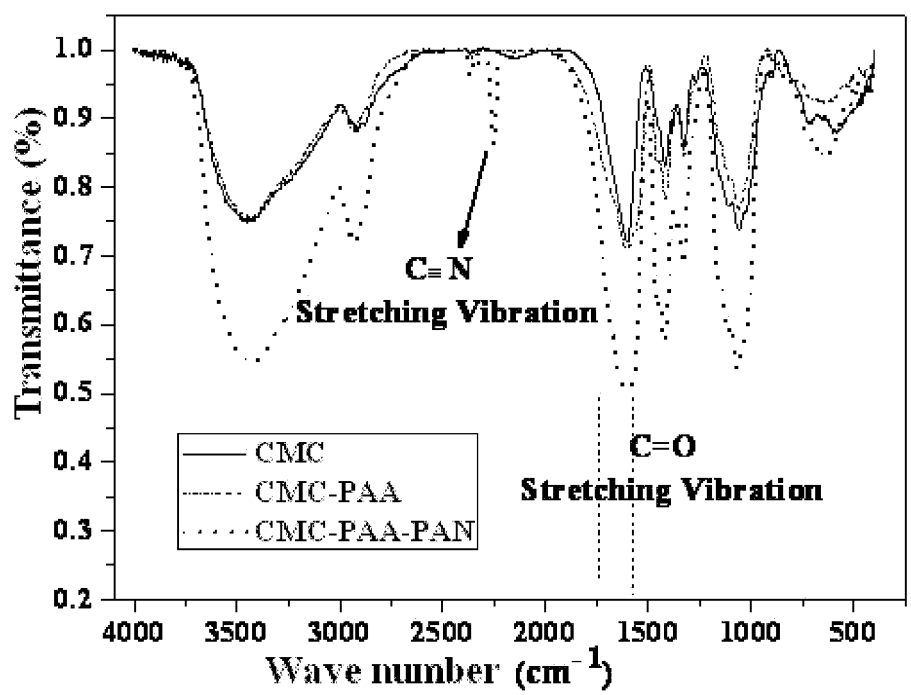
FIG. 1 is an infrared spectrogram comparing the multi-functionally modified polymer binders prepared with sodium carboxymethyl cellulose under various reaction systems according to embodiments 1 and 2 of the present invention.

Coating thickness parameters: 100 µm for positive electrode-LFP, 80 µm for negative electrode-Si, and 50 µm for graphite.

Sodium carboxymethyl cellulose is abbreviated as CMC; arabic gum is denoted as Acacia; xanthan gum is abbreviated as XG; pectin is denoted as Pectin; gelatin is denoted as Gelatin; polyethyleneimine is abbreviated as PEI; cyclodextrin is denoted as Cyclodextrin.

DETAILED DESCRIPTION OF THE EMBODIMENTS

The following embodiments are for further describing this invention rather than limiting the invention.

Sodium carboxymethyl cellulose is abbreviated as CMC; arabic gum is denoted as Acacia; xanthan gum is abbreviated as XG; pectin is denoted as Pectin; gelatin is denoted as Gelatin; polyethyleneimine is abbreviated as PEI; cyclodextrin is denoted as Cyclodextrin. Acrylic acid is abbreviated as AA; acrylonitrile is abbreviated as AN; acrylamide is abbreviated as AM; methyl methacrylate is abbreviated as MMA; styrene is abbreviated as St.

Preparation of electrodes comprising the active materials: mixing an electrode material, a conductive agent and the binder according to a certain ratio, grinding the mixture to obtain a slurry and coating an aluminum foil (positive electrode) or a copper foil (negative electrode) with the slurry. A thickness of nano silicone powders was 80 μm (copper foil substrate), a thickness of graphite (copper foil substrate) was 50 μm, and a thickness of lithium iron phosphate was 100 μm (aluminum foil substrate).

Preparation of an electrode comprising only the binder: coating an aluminum foil with a 2 wt % binder with a coating thickness of 200 μm.

Peel strength measurement: cutting the electrode to obtain a segment having a width of 15 mm, and performing a measurement on the segment using a peel strength testing device (Shenzhen, Kaiqiangli, 180° peel tester) with a peeling rate of 20 mm/min; the results are listed in a table.

Embodiment 1

(1) First dissolving 1 g of sodium carboxymethyl cellulose in 50 ml of deionized water (DI-Water) in advance, and thoroughly stirring for 0.5-2.5 hours under an argon atmosphere to remove oxygen and obtain a solution which was uniform and showed high dispersity with a stirring rate of 100-500 rpm;

(2) adding 0.1 g of $(NH_4)_2S_2O_8$ as an initiator to the solution obtained in step (1), thoroughly stirring to obtain a mixing solution; adding 2.5 g of acrylic acid as an monomer to the mixing solution, adjusting a reaction temperature to 55° C. and keeping stirring to allow reaction for 2.5 hours with the temperature held constant to obtain a transparent and uniform glue solution which was the multi-functionally modified polymer binder for lithium ion batteries. See table 1, the binder had a solids content of 6.5 wt % and a viscosity of 164.5 mPa·s. See FIG. 1 for the infrared spectrogram.

Embodiment 2

Embodiment 2 was different from embodiment 1 in that: the monomers added were 2.5 g of acrylic acid and 0.84 g of acrylonitrile, and the initiators used were 0.1 g of $(NH_4)_2S_2O_8$ and 0.03 g of $NaHSO_3$. Eventually a light white and slightly transparent emulsion (the multi-functionally modified polymer binder) was obtained. See table 1, the binder had a solids content of 8 wt % and a viscosity of 432.1 mPa·s. See FIG. 1 for the infrared spectrogram.

Embodiment 3

Embodiment 3 was different from embodiment 1 in that: the monomers added were 2.5 g of acrylic acid, 0.84 g of acrylonitrile and 1 g of acrylamide, the initiators used were 0.1 g of $(NH_4)_2S_2O_8$ and 0.03 g of $NaHSO_3$, and the reaction temperature was 60° C. Eventually a transparent and slightly white emulsion (the multi-functionally modified polymer binder) was obtained. See table 1, the binder had a solids content of 9.6 wt % and a viscosity of 1377.4 mPa·s. See FIG. 2 for the infrared spectrogram.

Embodiment 4

Embodiment 4 was different from embodiment 1 in that: the monomers added were 2.5 g of acrylic acid and 2.49 g of acrylamide, and the initiators used were 0.1 g of $(NH_4)_2S_2O_8$ and 0.03 g of $NaHSO_3$. Eventually a transparent glue solution (the multi-functionally modified polymer binder) was obtained. See table 1, the binder had a solids content of 10.7 wt % and a viscosity of 1481.3 mPa·s.

Embodiment 5

Embodiment 5 was different from embodiment 1 in that: the monomers added were 2.5 g of acrylic acid and 3.47 g of methyl methacrylate, and the initiators used were 0.1 g of $(NH_4)_2S_2O_8$ and 0.03 g of $NaHSO_3$. Eventually a bright white emulsion (the multi-functionally modified polymer binder) was obtained. See table 1, the binder had a solids content of 12.3 wt % and a viscosity of 215.8 mPa·s.

Embodiment 6

Embodiment 6 was different from embodiment 1 in that: the monomers added were 7.2 g of acrylic acid and 0.53 g of acrylonitrile, and the initiators used were 0.1 g of $(NH_4)_2S_2O_8$ and 0.03 g of $NaHSO_3$. Eventually a transparent, slightly white and viscous solution (the multi-functionally modified polymer binder) was obtained. See table 1, the binder had a solids content of 14.9 wt % and a viscosity of 10381 mPa·s. See FIG. 8 for the peel strength thereof towards aluminum foil.

Embodiment 7

Embodiment 7 was different from embodiment 1 in that: the monomers added were 7.2 g of acrylic acid, 0.53 g of acrylonitrile and 0.71 g of acrylamide, and the initiators used were 0.1 g of $(NH_4)_2S_2O_8$ and 0.03 g of $NaHSO_3$. Eventually a transparent, slightly white and viscous solution (the multi-functionally modified polymer binder) was obtained. See table 1, the binder had a solids content of 15.9 wt % and a viscosity of 12531 mPa·s.

Embodiment 8

Embodiment 8 was different from embodiment 1 in that: the monomers added were 3.6 g of acrylic acid and 3 g of styrene, and the initiators used were 0.1 g of $(NH_4)_2S_2O_8$ and 0.03 g of $NaHSO_3$. Eventually a transparent solution (the multi-functionally modified polymer binder) was obtained. See table 1, the binder had a solids content of 13.2 wt % and a viscosity of 44.2 mPa·s.

Embodiment 9

Figure 7:
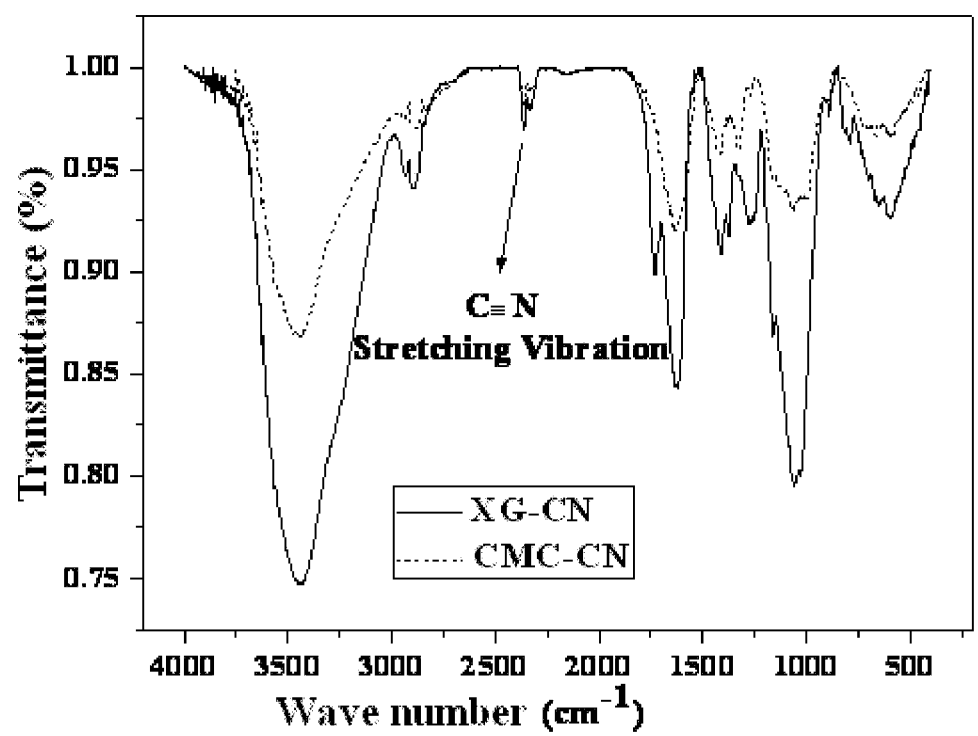
FIG. 7 is an infrared spectrogram comparing the multi-functionally modified polymer binders prepared with a base catalyst according to embodiments 9 and 21 of the present invention.

Embodiment 9 was different from embodiment 1 in that: the monomer added was 6.63 g of acrylonitrile, and the initiator was replaced with a catalyst, and the catalyst used is 1 ml of 20 wt % NaOH. Eventually a white and uniform emulsion (the multi-functionally modified polymer binder) was obtained. See table 1, the binder had a solids content of 13.2 wt % and a viscosity of 2536.5 mPa·s. See FIG. 7 for the infrared spectrogram.

Comparative Example 1

Comparative example 1 was different from embodiment 2 in that the polymer substrate was chitosan, a marine polysaccharide polymer. Eventually a white emulsion was obtained, with a solids content of 8.0 wt % and a viscosity of 6.47 mPa·s (see table 1).

The binders obtained in embodiments 1-9 and comparative example 1 were characterized. The data are shown in table 1 and FIGS. 1-2.

TABLE 1

| | Monomers | | | | | | | V | APF N | APS |
| --- | --- | --- | --- | --- | --- | --- | --- | --- | --- | --- |
| | AA | AN | AM | MMA | St | S/S | Color | mPa·s | | mN/mm |
| CMC | — | — | — | — | — | Solution/Water | Transparent | 1802.7 | 0.025 | 2 |
| E1 | 2.5 | — | — | — | — | Solution/Water | Transparent | 164.5 | 0.030 | 2 |
| E2 | 2.5 | 0.84 | — | — | — | Emulsion/Water | Light white | 432.1 | 0.057 | 4 |
| E3 | 2.5 | 0.84 | 1 | — | — | Emulsion/Water | Transparent | 1377.4 | 0.077 | 5 |
| E4 | 2.5 | — | 2.49 | — | — | Solution/Water | Transparent | 1481.3 | 0.035 | 2 |
| E5 | 2.5 | — | — | 3.47 | — | Emulsion/Water | White | 215.8 | 0.090 | 6 |
| E6 | 7.2 | 0.53 | — | — | — | Solution/Water | Transparent | 10381 | 1.05 | 70 |
| E7 | 7.2 | 0.53 | 0.71 | — | — | Solution/Water | Transparent | 12531 | 0.066 | 4 |
| E8 | 3.6 | — | — | — | 3 | Solution/NMP | Transparent | 44.2 | >1.166 | >78 |
| *E9 | — | 6.63 | — | — | — | Emulsion/Water | White | 2536.5 | 0.156 | 11 |
| C1 | 2.5 | 0.84 | | | | Emulsion | White | 6.47 | 0.027 | 2 |

*The product in Embodiment 9 was prepared by a Michael addition reaction of CMC with a base catalyst
S/S: Solubility/Solvent
V: Viscosity
APF: Average peel force
APS: Average peel strength The average peel strength in table 1 was determined by the following steps. Preparing an electrode comprising only the binder by directly coating an aluminum foil with 2 wt % binder with a coating thickness of 200 μm. Measuring the peel strength by cutting the electrode to obtain a segment having a width of 15 mm, and performing a measurement on the segment using a peel strength testing device (Shenzhen, Kaiqiangli, 180° peel tester) with a peeling rate of 20 mm/min. The results are listed in a table.

Figure 2:
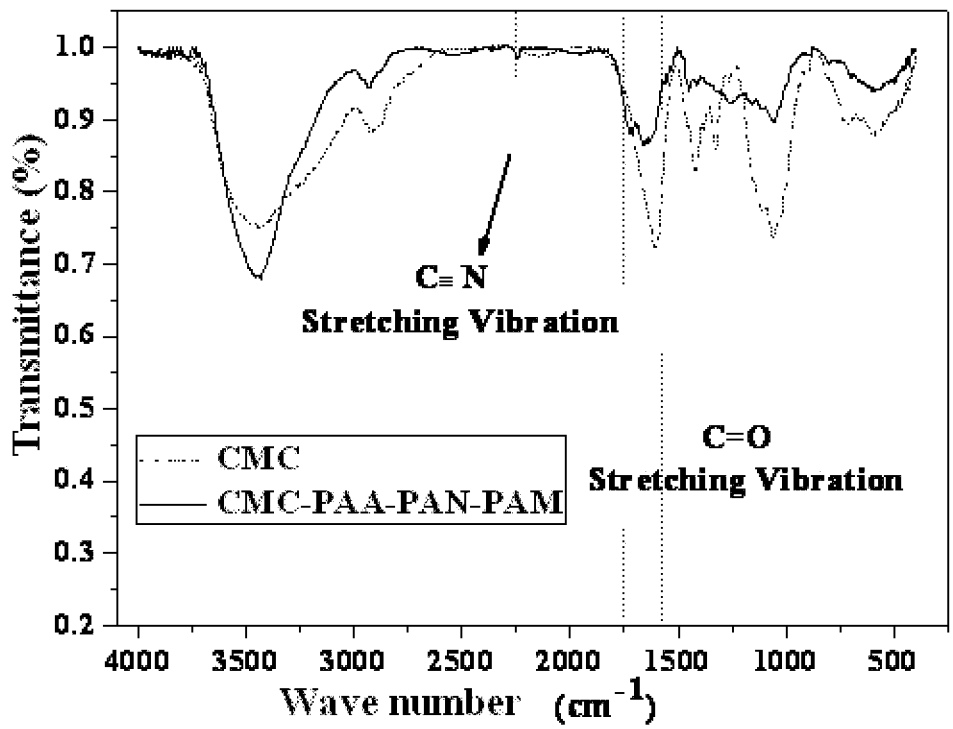
FIG. 2 is an infrared spectrogram comparing the multi-functionally modified polymer binders prepared with sodium carboxymethyl cellulose under various reaction systems according to embodiment 3 of the present invention.

Conclusion from table 1 and FIGS. 1 to 2: The multi-functionally modified CMC-based polymer binder showed high water-solubility (embodiments 1 to 7) or oil-solubility (embodiment 8), largely improved peel strength towards the current collector, and improved comprehensive performances. Compared with the unmodified CMC binder, the multi-functionally modified CMC-based polymer binder obtained in embodiments 6, 8 and 9 had been greatly improved in the binding properties. Moreover, the acrylic acid-modified polymer binder had obtained a high water-solubility of polyacrylic acid or salts thereof and showed a lower viscosity (embodiment 1). The polymer binders modified with acrylic acid and acrylonitrile had obtained both the high water-solubility (of polyacrylic acid or salts thereof) and good binding performance (of polyacrylonitrile), and showed improved peel strengths (embodiments 2 and 6). The polymer binders modified with acrylic acid, acrylonitrile and acrylamide, had showed well-balanced properties of water-solubility, binding performance and flexibility, and improved comprehensive performances (embodiments 3 and 7). The polymer binder modified with acrylic acid and styrene, can be applied in an organic solvent by regulating its water-solubility and oil-solubility through adjusting the ratio of the hydrophilic monomer and the lipophilic monomer (embodiment 8). It is noteworthy that, compared with modified marine polysaccharide polymers (see CN105576247A, e.g. CTS-PAA-PAN), under identical reaction conditions, the binder showed a doubled peel strength (comparing the binders of embodiment 2 and comparative example 1).

Embodiment 10

Embodiment 10 was different from embodiment 1 in that: sodium carboxymethyl cellulose was replaced with arabic gum, and 2.5 g of acrylic acid was replaced with 5 g of acrylic acid. Eventually a transparent and uniform glue solution (the multi-functionally modified polymer binder) was obtained. See table 2, the binder had a solids content of 10.7 wt % and a viscosity of 23159 mPa·s. See FIG. 3 for the infrared spectrogram. See FIG. 8 for the peel strength thereof towards aluminum foil.

Embodiment 10*

The transparent and uniform glue solution in embodiment 10 was neutralized with LiOH to a pH of 6 to 7, so as to obtain a multi-functionally modified polymer binder. See table 2, the binder had a solids content of 11.5 wt % and a viscosity of 24581 mPa·s.

Embodiment 11

Embodiment 11 was different from embodiment 10 in that: the monomer added was 3.18 g of acrylonitrile, and the initiators used were 0.1 g of $(NH_4)_2S_2O_8$ and 0.03 g of $NaHSO_3$. Eventually a white emulsion (the multi-functionally modified polymer binder) was obtained. See table 2, the binder had a solids content of 7.7 wt % and a viscosity of 13.2 mPa·s.

Embodiment 12

Embodiment 12 was different from embodiment 10 in that: the monomer added was 4.26 g of acrylamide, and the initiators used were 0.1 g of $(NH_4)_2S_2O_8$ and 0.03 g of $NaHSO_3$. Eventually a transparent and slightly white solution (the multi-functionally modified polymer binder) was obtained. See table 2, the binder had a solids content of 9.5 wt % and a viscosity of 21.5 mPa·s.

Embodiment 13

Embodiment 13 was different from embodiment 10 in that: the monomers added were 2.5 g of acrylic acid and 0.84 g of acrylonitrile, the initiators used were 0.1 g of $(NH_4)_2S_2O_8$ and 0.03 g of $NaHSO_3$, and the reaction temperature was 60° C. Eventually a white emulsion (the multi-functionally modified polymer binder) was obtained. See table 2, the binder had a solids content of 8 wt % and a viscosity of 1.86 mPa·s. See FIG. 3 for the infrared spectrogram. See FIG. 8 for the peel strength thereof towards aluminum foil.

Embodiment 14

Embodiment 14 was different from embodiment 10 in that: the monomers added were 4 g of acrylic acid and 1 g of acrylonitrile, and the initiators used were 0.1 g of $(NH_4)_2S_2O_8$ and 0.03 g of $NaHSO_3$. Eventually a white emulsion (the multi-functionally modified polymer binder) was obtained. See table 2, the binder had a solids content of 10.7 wt % and a viscosity of 4.8 mPa·s.

Embodiment 15

Figure 6:
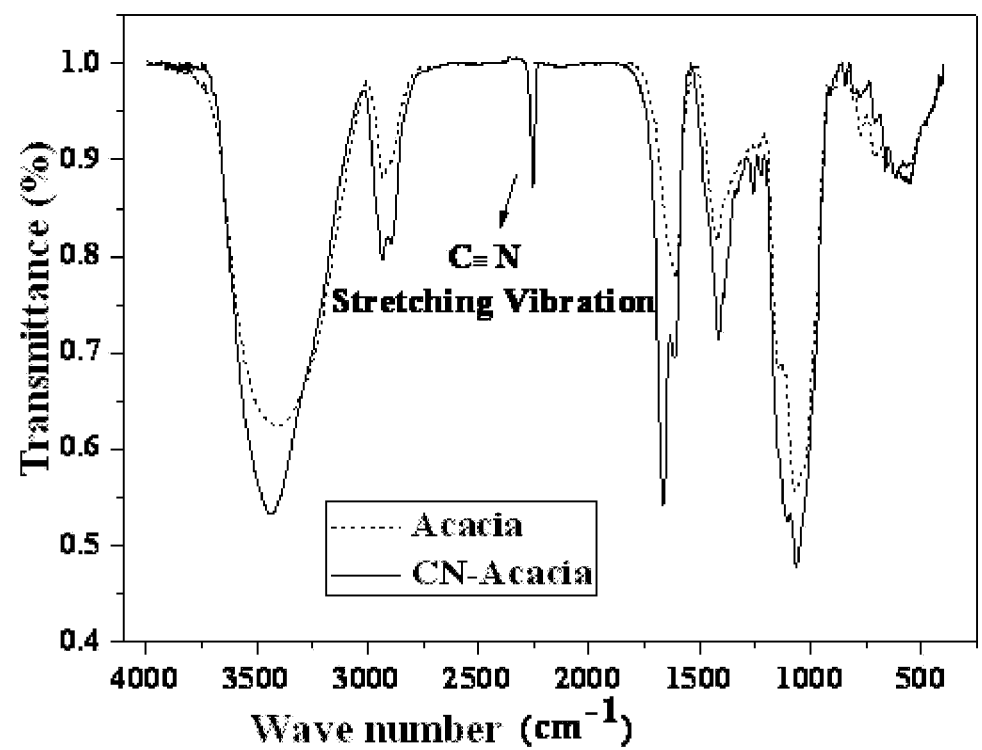
FIG. 6 is an infrared spectrogram comparing the multi-functionally modified polymer binders prepared with arabic gum and a base catalyst according to embodiment 15 of the present invention.

Embodiment 15 was different from embodiment 10 in that: the monomer added was 6.63 g of acrylonitrile, and the initiator was replaced with a catalyst, and the catalyst used is 1 ml of 20 wt % NaOH. Eventually a white and uniform emulsion (the multi-functionally modified polymer binder) was obtained. See table 2, the binder had a solids content of 13.2 wt % and a viscosity of 5.6 mPa·s. See FIG. 6 for the infrared spectrogram.

The binders obtained in embodiments 10-15 were characterized. The data are shown in table 2 and FIG. 3.

TABLE 2

| | Monomers | | | | | V | | APS |
|---|---|---|---|---|---|---|---|---|
| | AA | AN | AM | S/S | Color | mPa·s | APF N | mN/mm |
| E10 | 5 | — | — | Solution/Water | Transparent | 23159 | >0.9 | >60 |
| E10* | 5 | — | — | Solution/Water | Transparent | 18581 | >0.813 | >54 |
| E11 | — | 3.18 | — | Emulsion/Water | White | 13.2 | >1.3 | >86 |
| E12 | — | — | 4.26 | Solution/Water | Transparent | 21.5 | 0.04 | 2 |
| E13 | 2.5 | 0.84 | — | Emulsion/Water | White | 1.9 | >1.2 | >80 |
| E14 | 4 | 1 | — | Emulsion/Water | Transparent | 4.8 | >0.9 | >60 |
| E15** | — | 6.63 | — | Emulsion/Water | White | 5.6 | >1.5 | >90 |
| PVDF | — | — | — | Solution/NMP | Transparent | — | 0.539 | 36 |

The binder of embodiment 10* is an Acacia-PAA-COOLi binder prepared by neutralizing the glue solution of embodiment 10 with LiOH.
**The product in Embodiment 15 was prepared by a Michael addition reaction of Acacia with a base catalyst.
S/S: Solubility/Solvent
V: Viscosity
APF: Average peel force
APS: Average peel strength The average peel strength in table 2 was determined by the following steps. Preparing an electrode comprising only the binder by directly coating an aluminum foil with 2 wt % binder with a coating thickness of 200 μm. Measuring the peel strength by cutting the electrode to obtain a segment having a width of 15 mm, and performing a measurement on the segment using a peel strength testing device (Shenzhen, Kaiqiangli, 180° peel tester) with a peeling rate of 20 mm/min. The results are listed in a table.

Figure 3:
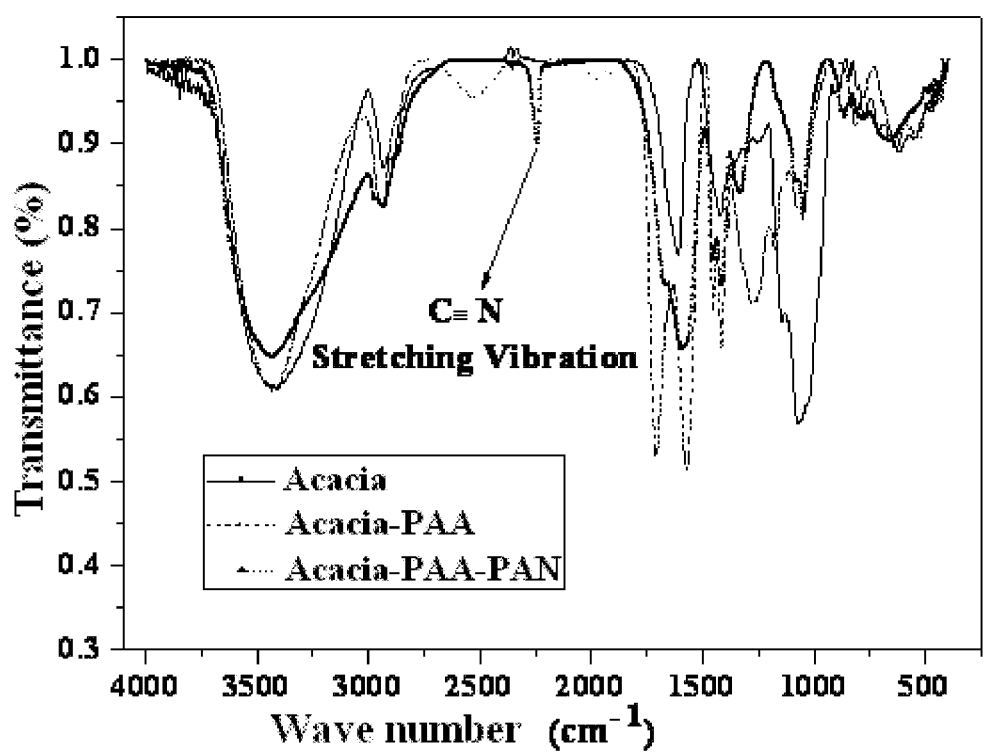
FIG. 3 is an infrared spectrogram comparing the multi-functionally modified polymer binders prepared with arabic gum under various reaction systems according to embodiments 10 and 13 of the present invention.
Figure 8:
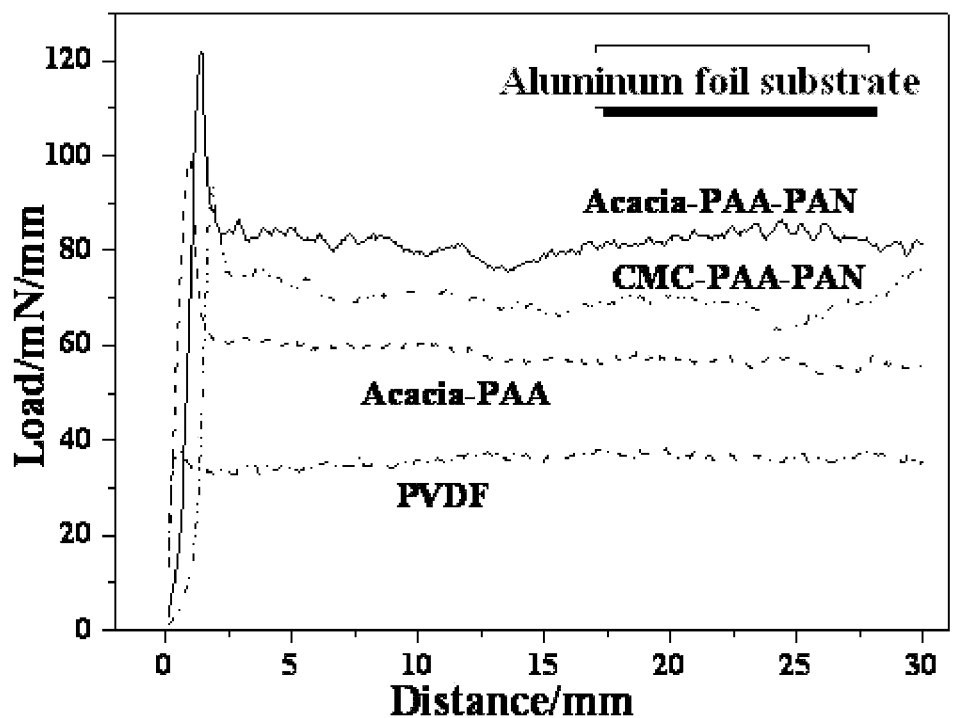
FIG. 8 shows a comparison of the multi-functionally modified polymer binders of embodiments 6, 10 and 13 in peel strength towards aluminum foil.

Conclusion from table 2 and FIG. 3: The multi-functionally modified polymer binder showed high water-solubility, largely improved peel strength towards the current collector, and improved comprehensive performances. Except the binder of embodiment 12, other multi-functionally modified polymer binders of embodiments 11 to 16 showed binding strengths higher than that of the current commercial PVDF system. It is noteworthy that, the Acacia-PAA-COOLi binder, which was prepared by neutralizing the grafted polyacrylic acid, showed a higher solubility and a low viscosity, but its peel strength decreased (see embodiments 10 and 10*). FIG. 8 shows a comparison of the multi-functionally modified polymer binders of embodiments 6, 10 and 13 in peel strength towards aluminum foil. As can be seen from the figure, dually-modified CMC (embodiment 6) showed a peel strength of 70 mN/mm towards aluminum foil, while that of unmodified CMC was 2 mN/mm. Singly-modified arabic gum (embodiment 10) and dually-modified arabic gum respectively showed peel strengths of 60 mN/mm and 80 mN/mm towards aluminum foil. Parallel experiments showed that PVDF had a peel strength of 36 mN/mm towards aluminum foil. As can be seen from above, through functional modification of polymers, the invention has significantly improved the peel strength of the binder towards aluminum foil. Accordingly, it is a promising binder for lithium ion batteries.

Embodiment 16

Figure 4:
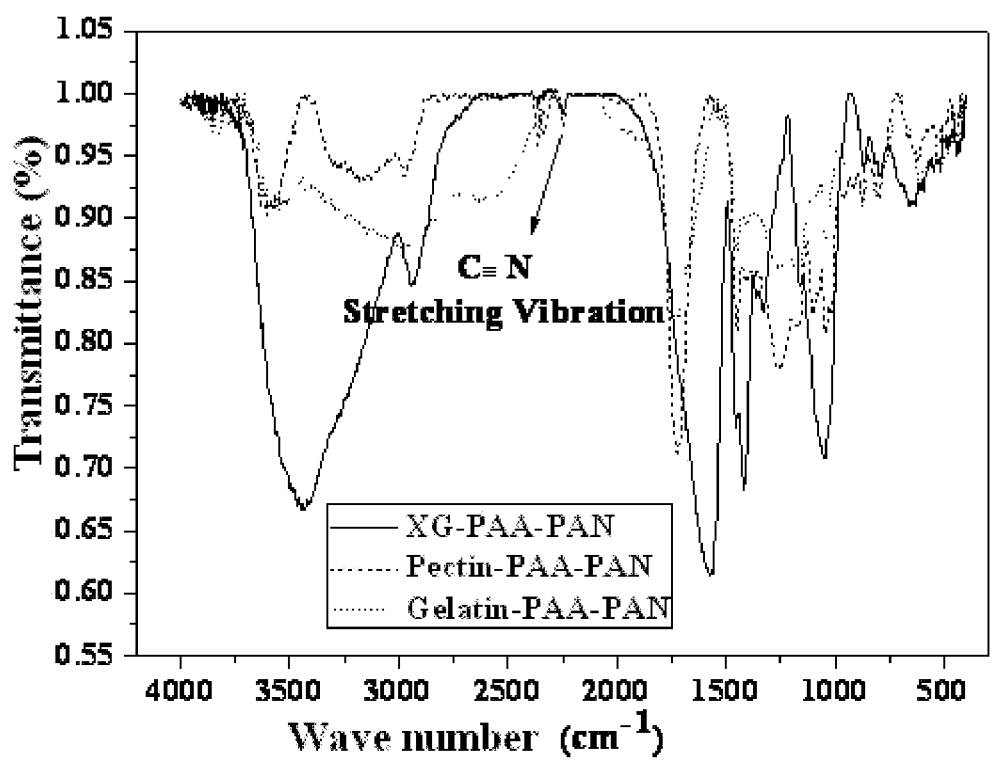
FIG. 4 is an infrared spectrogram comparing the multi-functionally modified polymer binders prepared with various polymer substrates under various reaction systems according to embodiments 16 to 18 of the present invention.

Embodiment 16 was different from embodiment 1 in that: the polymer substrate used was xanthan gum, the monomers added were 3.6 g of acrylic acid and 0.53 g of acrylonitrile, and the initiators used were 0.1 g of $(NH_4)_2S_2O_8$ and 0.03 g of $NaHSO_3$. Eventually a white emulsion (the multi-functionally modified polymer binder) was obtained. See table 3, the binder had a solids content of 9.3 wt % and a viscosity of 3621.4 mPa·s. See FIG. 4 for the infrared spectrogram.

Embodiment 17

Embodiment 17 was different from embodiment 1 in that: the polymer substrate used was pectin, the monomers added were 3.6 g of acrylic acid and 0.53 g of acrylonitrile, and the initiators used were 0.1 g of $(NH_4)_2S_2O_8$ and 0.03 g of $NaHSO_3$. Eventually a white, uniform and viscous solution (the multi-functionally modified polymer binder) was obtained. See table 3, the binder had a solids content of 9.3 wt % and a viscosity of 215.1 mPa·s. See FIG. 4 for the infrared spectrogram.

Embodiment 18

Embodiment 18 was different from embodiment 1 in that: the polymer substrate used was gelatin, the monomers added were 3.6 g of acrylic acid and 0.53 g of acrylonitrile, and the initiators used were 0.1 g of $(NH_4)_2S_2O_8$ and 0.03 g of $NaHSO_3$. Eventually a product with separated layers was obtained (the multi-functionally modified polymer binder). See table 3, the binder had a solids content of 9.3 wt % and a viscosity of 250.6 mPa·s. See FIG. 4 for the infrared spectrogram.

Embodiment 19

Figure 5:
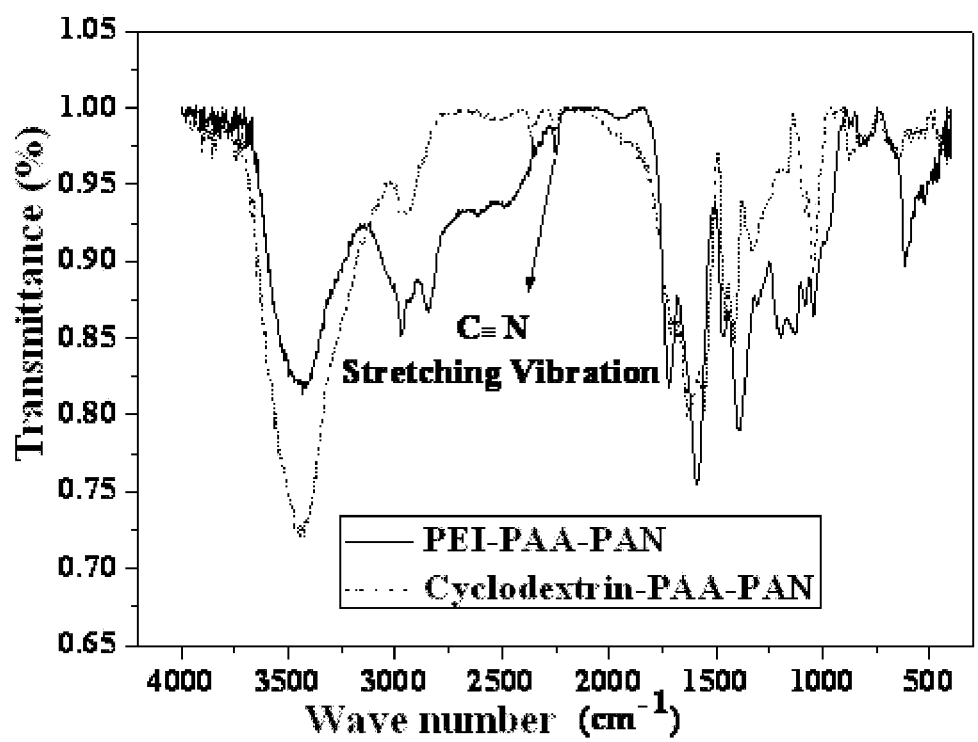
FIG. 5 is an infrared spectrogram comparing the multi-functionally modified polymer binders prepared with various polymer substrates under various reaction systems according to embodiments 19 to 20 of the present invention.

Embodiment 19 was different from embodiment 1 in that: the polymer substrate used was polyethyleneimine (PEI), the monomers added were 3.6 g of acrylic acid and 0.53 g of acrylonitrile, and the initiators used were 0.1 g of $(NH_4)_2S_2O_8$ and 0.03 g of $NaHSO_3$. Eventually a yellow and uniform solution (the multi-functionally modified polymer binder) was obtained. See table 3, the binder had a solids content of 9.3 wt % and a viscosity of 2.43 mPa·s. See FIG. 5 for the infrared spectrogram.

Embodiment 20

Embodiment 20 was different from embodiment 1 in that: the polymer substrate used was cyclodextrin, the monomers added were 3.6 g of acrylic acid and 0.53 g of acrylonitrile, and the initiators used were 0.1 g of $(NH_4)_2S_2O_8$ and 0.03 g of $NaHSO_3$. Eventually a transparent and uniform solution (the multi-functionally modified polymer binder) was obtained. See table 3, the binder had a solids content of 9.3 wt % and a viscosity of 219.4 mPa·s. See FIG. 5 for the infrared spectrogram.

Embodiment 21

Embodiment 21 was different from embodiment 1 in that: the polymer substrate used was xanthan gum, the monomer added was 6.63 g of acrylonitrile, and the catalyst used is 1 ml of 20 wt % NaOH. Eventually a white emulsion (the multi-functionally modified polymer binder) was obtained. See table 3, the binder had a solids content of 13.2 wt % and a viscosity of 5613.8 mPa·s. See FIG. 7 for the infrared spectrogram.

The binders obtained in embodiments 16-21 were characterized. The data are shown in table 3 and FIGS. 4, 5 and 7.

TABLE 3

| | Monomers | | | | V | APS | |
|---|---|---|---|---|---|---|---|
| | AA | AN | S/S | Color | mPa·s | APF N | mN/mm |
| XG | 3.6 | 0.53 | Colloidal emulsion | White | 3621.4 | 0.04 | 2 |
| *XG | — | 6.63 | Colloidal emulsion | White | 5613.8 | 0.15 | 10 |
| Pectin | 3.6 | 0.53 | Viscous solution | White | 215.1 | >1.0 | >66 |
| Gelatin | 3.6 | 0.53 | Emulsion | White | 250.6 | 0.32 | 21 |
| PEI | 3.6 | 0.53 | Solution/Water | Yellow | 2.4 | 0.28 | 19 |
| Cyclodextrin | 7.2 | 0.53 | Solution/Water | Transparent | 219.4 | >0.9 | >58 |

*XG: The product in Embodiment 21 was prepared by a Michael addition reaction of xanthan gum with a base catalyst.
S/S: Solubility/Solvent
V: Viscosity
APF: Average peel force
APS: Average peel strength The average peel strength in table 3 was determined by the following steps. Preparing an electrode comprising only the binder by directly coating an aluminum foil with 2 wt % binder with a coating thickness of 200 Measuring the peel strength by cutting the electrode to obtain a segment having a width of 15 mm, and performing a measurement on the segment using a peel strength testing device (Shenzhen, Kaiqiangli, 180° peel tester) with a peeling rate of 20 mm/min. The results are listed in a table.

Conclusion from table 3: The multi-functionally modified polymer binder showed high water-solubility and binding strength, largely improved peel strength towards the current collector, and improved comprehensive performances, and thus can be used as a novel binder for lithium ion batteries.

Embodiment 22

Lithium iron phosphate was used as a positive electrode material, and the transparent, slightly white and viscous solution as prepared in embodiment 6 was used as the multi-functionally modified polymer water-based binder for lithium ion batteries (this binder was selected for performance test since it showed the highest peel strength).

1. Preparation of Test Electrodes

As an example of the lithium ion battery positive electrode of the present invention, the lithium ion battery positive electrode comprises a current collector and a lithium ion battery positive electrode slurry supported on the current collector; the lithium ion battery positive electrode slurry comprises a positive electrode active material, a conductive agent, the solution prepared in embodiment 6 (which is transparent, slightly white and viscous, as the multi-functionally modified polymer water-based binder), and a solvent; a weight ratio of the positive electrode active material, the conductive agent and the binder is 90:5:5; the solvent is water. The positive electrode active material is lithium iron phosphate ($LiFePO_4$, LFP); the conductive agent is acetylene black; the current collector is an aluminum foil current collector; a solids content of the lithium ion battery positive electrode slurry is 45 wt %, and a viscosity of the lithium ion battery positive electrode slurry is 3000 mPa·s.

LFP and the conductive agent were mixed and stirred until uniform dispersion; then the transparent, slightly white and viscous solution prepared in embodiment 6 was added into the mixture as a water-based binder, stirred well, and a proper quantity of water was added to adjust the viscosity, so as to obtain an LFP electrode slurry; the slurry was coated onto an aluminum foil which was then vacuum-dried at 90° C. so as to obtain the LFP positive electrode. The vacuum-dried electrode was cut and weighed, and then installed into a 2025 battery case, with a lithium sheet as the counter electrode, a polyethylene film as the separator and 1 M $LiPF_6$ EC/DMC/DEC (v/v/v=1/1) as the electrolyte, to assemble a battery which was then subjected to a constant current charge-discharge test.

2. Preparation of Comparative Electrodes

The comparative electrodes were prepared by the same method wherein PVDF and the modified marine polysaccharide polymer CTS-PAA-PAN of comparative example 1 were used as the binders.

3. Electrochemical Test

An electrochemical test was performed on the test electrodes and the comparative electrodes to determine the charging and discharging performances.

4. Result Analysis

Figure 10:
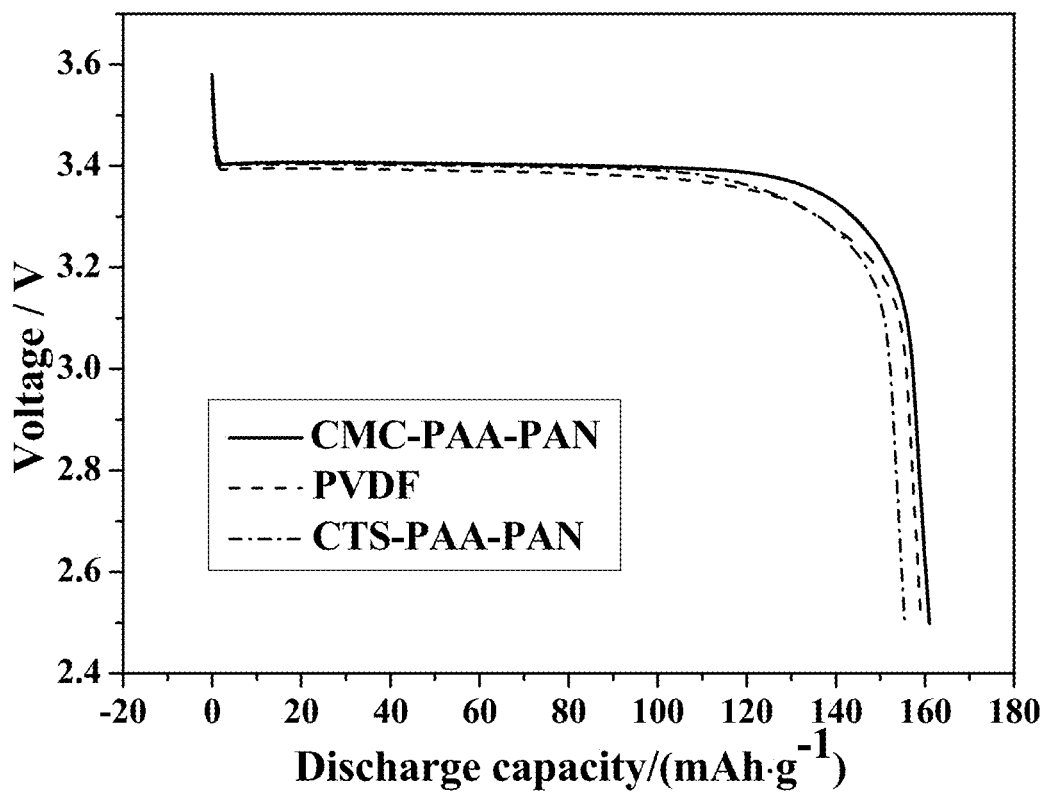
FIG. 10 shows voltage-specific capacity curves during initial charging and discharging of lithium iron phosphate and a comparative electrode as disclosed in embodiment 22.

FIG. 10 shows voltage-specific capacity curves of the test electrodes and the comparative electrodes of the present embodiment at a charging and discharging current density of 0.2C. As can be seen from the figure, the LFP battery prepared with the multi-functionally modified polymer binder CMC-PAA-PAN showed a longer discharge plateau than those with PVDF and the modified marine polysaccharide polymer CTS-PAA-PAN binders, indicating that the battery with CMC-PAA-PAN experienced less polarization during discharging, and suggesting that the multi-functionally modified polymer binder had improved the conductive performance of the electrode system and the overall electrochemical performance of the battery.

Embodiment 23

Lithium iron phosphate was used as a positive electrode material, and the products as prepared in embodiments 6 and 13 were respectively used as the multi-functionally modified polymer water-based binder for lithium ion batteries (this binder was selected for performance test since it showed the highest peel strength).

1. Preparation of Test Electrodes

As an example of the lithium ion battery positive electrode of the present invention, the lithium ion battery positive electrode comprises a current collector and a lithium ion battery positive electrode slurry supported on the current collector; the lithium ion battery positive electrode slurry comprises a positive electrode active material, a conductive agent, the product prepared in embodiment 6 or 13 (as the multi-functionally modified polymer water-based binder), and a solvent; a weight ratio of the positive electrode active material, the conductive agent and the binder is 90:5:5; the solvent is water. The positive electrode active material is lithium iron phosphate ($LiFePO_4$, LFP); the conductive agent is acetylene black; the current collector is an aluminum foil current collector; a solids content of the lithium ion battery positive electrode slurry is 45 wt %, and a viscosity of the lithium ion battery positive electrode slurry is 3000 mPa·s.

LFP and the conductive agent were mixed and stirred until uniform dispersion; then the transparent, slightly white and viscous solution prepared in embodiment 6 or 13 was added into the mixture as a water-based binder, stirred well, and a proper quantity of water was added to adjust the viscosity, so as to obtain an LFP electrode slurry; the slurry was coated onto an aluminum foil which was then vacuum-dried at 90° C. so as to obtain the LFP positive electrode. The vacuum-dried electrode was cut and weighed, and then installed into a 2025 battery case, with a lithium sheet as the counter electrode, a polyethylene film as the separator and 1 M $LiPF_6$ EC/DMC/DEC (v/v/v=1/1) as the electrolyte, to assemble a battery which was then subjected to an electrochemical performance test.

2. Preparation of Comparative Electrodes

The comparative electrodes were prepared by the same method wherein PVDF and the modified marine polysaccharide polymer CTS-PAA-PAN of comparative example 1 were used as the binders.

3. Electrochemical Test

An electrochemical test was performed on the test electrodes and the comparative electrodes to determine the electrochemical Impedance.

4. Result Analysis

Figure 11:
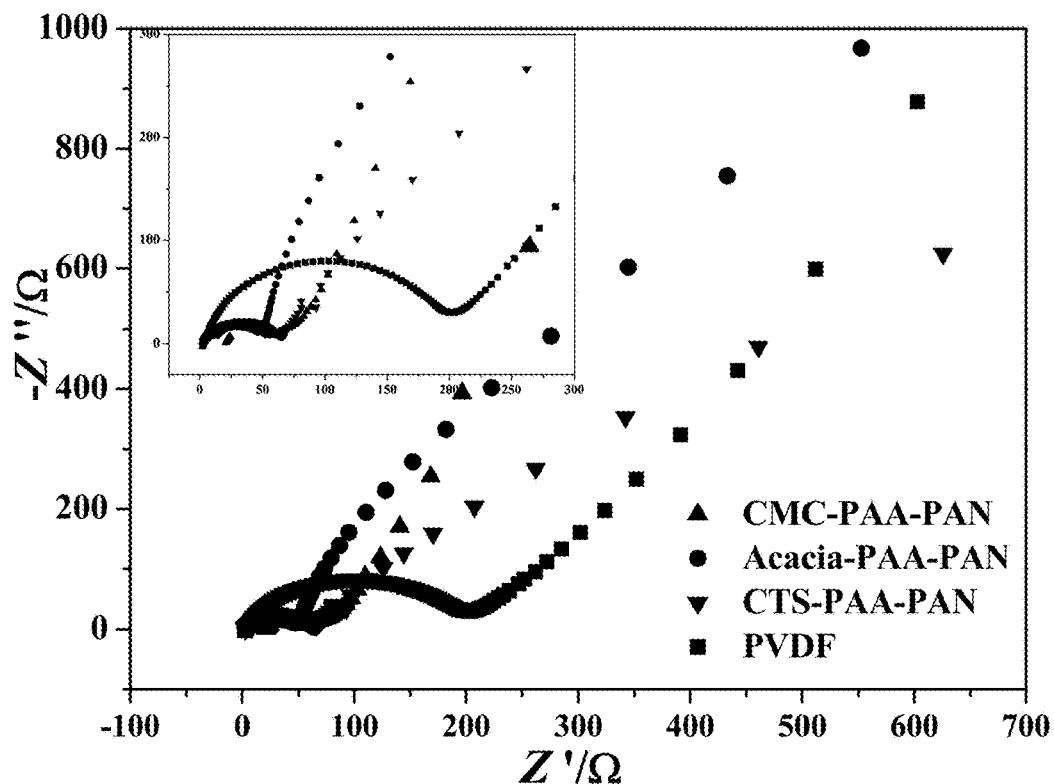
FIG. 11 shows electrochemical impedance curves of lithium iron phosphate and a comparative electrode as disclosed in embodiment 23.

FIG. 11 shows electrochemical impedance curves of the test electrodes and the comparative electrodes of the present embodiment under perturbation of 5 mv. As can be seen from the figure, the LFP battery prepared with the multi-functionally modified polymer binder (CMC-PAA-PAN or Acacia-PAA-PAN) showed a electrochemical impedance lower than those with PVDF and the modified marine polysaccharide polymer CTS-PAA-PAN binders, indicating that the battery experienced less polarization during charging and discharging, and suggesting that the multi-functionally modified polymer binder (CMC-PAA-PAN or Acacia-PAA-PAN) had improved the electron/ion conducting performance of the battery system, facilitated charging and discharging at high rate, and improved the overall electrochemical performance of the battery.

Embodiment 24

A ternary material ($LiNi_{1/3}Mn_{1/3}Co_{1/3}O_2$, NMC) was used as a positive electrode material, and the transparent, slightly white and viscous solution as prepared in embodiment 6 was used as the multi-functionally modified polymer water-based binder for lithium ion batteries (this binder was selected for performance test since it showed the highest peel strength).

1. Preparation of Test Electrodes

As an example of the lithium ion battery positive electrode of the present invention, the lithium ion battery positive electrode comprises a current collector and a lithium ion battery positive electrode slurry supported on the current collector; the lithium ion battery positive electrode slurry comprises a positive electrode active material, a conductive agent, the solution prepared in embodiment 6 (which is transparent, slightly white and viscous, as the multi-functionally modified polymer water-based binder), and a solvent; a weight ratio of the positive electrode active material, the conductive agent and the binder is 85:9:6; the solvent is water. The positive electrode active material is the ternary material ($LiNi_{1/3}Mn_{1/3}Co_{1/3}O_2$, NMC); the conductive agent is acetylene black; the current collector is an aluminum foil current collector; a solids content of the lithium ion battery positive electrode slurry is 45 wt %, and a viscosity of the lithium ion battery positive electrode slurry is 3000 mPa·s.

NMC and the conductive agent were mixed and stirred until uniform dispersion; then the transparent, slightly white and viscous solution prepared in embodiment 6 was added into the mixture as a water-based binder, stirred well, and a proper quantity of water was added to adjust the viscosity, so as to obtain an NMC electrode slurry; the slurry was coated onto an aluminum foil which was then vacuum-dried at 90° C. so as to obtain the NMC positive electrode. The vacuum-dried electrode was cut and weighed, and then installed into a 2025 battery case, with a lithium sheet as the counter electrode, a polyethylene film as the separator and 1 M $LiPF_6$ EC/DMC/DEC (v/v/v=1/1) as the electrolyte, to assemble a battery which was then subjected to an electrochemical performance test.

2. Preparation of Comparative Electrodes

The comparative electrodes were prepared by the same method wherein PVDF and the modified marine polysaccharide polymer CTS-PAA-PAN of comparative example 1 were used as the binders.

3. Electrochemical Test

An electrochemical test was performed on the test electrodes and the comparative electrodes to determine the charging and discharging performances.

4. Result Analysis

Figure 12:
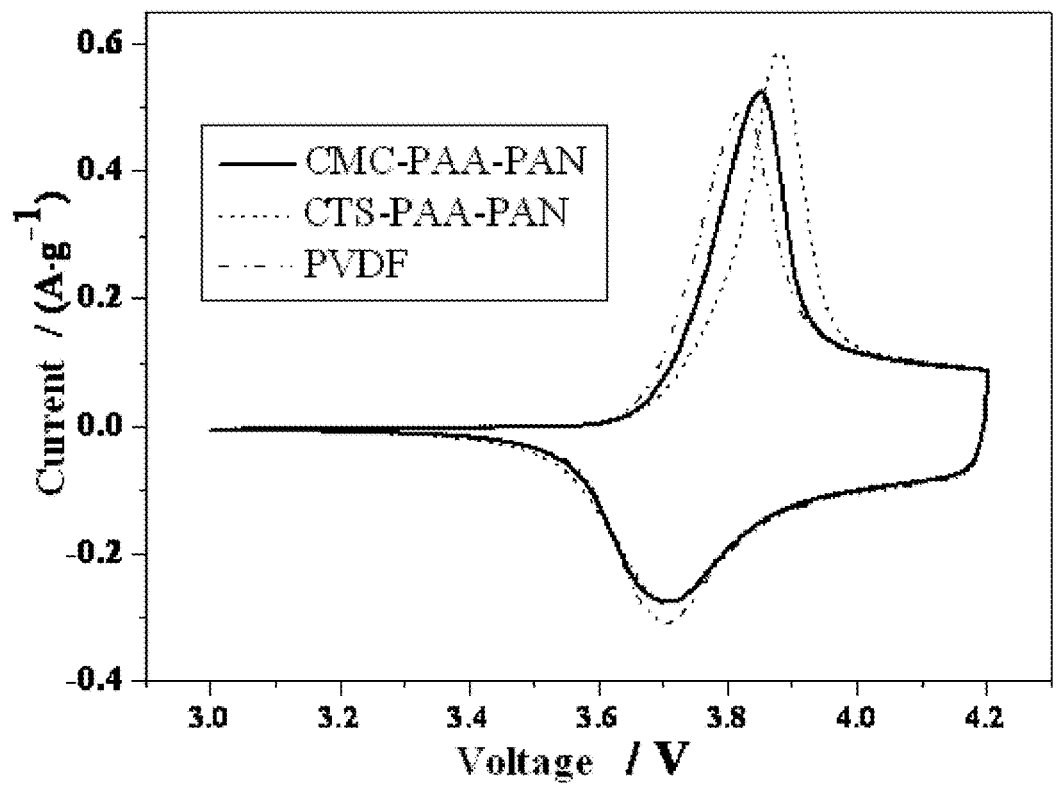
FIG. 12 is a cyclic voltammogram comparing a ternary material and a comparative electrode as disclosed in embodiment 24 under a scan rate of 0.2 mV/s.

FIG. 12 is a cyclic voltammogram of the test electrode and the comparative electrode under a scan rate of 0.2 mV/s. As can be seen from the figure, the curve of the NMC battery, which was prepared with the multi-functionally modified polymer binder CMC-PAA-PAN, was generally consistent with the curve of the PVDF system, and showed a voltage interval between the oxidation and reduction peaks commensurate with that of the PVDF system while smaller than that of the CTS-PAA-PAN system, indicating that the NMC electrode with the CMC-PAA-PAN binder exhibited lower polarization and high electrochemical performance, and further, the multi-functionally modified polymer binder showed high electrochemical stability under the working voltage.

Embodiment 25

A ternary material ($LiNi_{1/3}Mn_{1/3}Co_{1/3}O_2$, NMC) was used as a positive electrode material, and the transparent solution as prepared in embodiment 7 was used as the multi-functionally modified polymer water-based binder for lithium ion batteries.

1. Preparation of Test Electrodes

As an example of the lithium ion battery positive electrode of the present invention, the lithium ion battery positive electrode comprises a current collector and a lithium ion battery positive electrode slurry supported on the current collector; the lithium ion battery positive electrode slurry comprises a positive electrode active material, a conductive agent, the transparent solution prepared in embodiment 7 (as the multi-functionally modified polymer water-based binder), and a solvent; a weight ratio of the positive electrode active material, the conductive agent and the binder is 85:9:6; the solvent is water. The positive electrode active material is the ternary material ($LiNi_{1/3}Mn_{1/3}Co_{1/3}O_2$, NMC); the conductive agent is acetylene black; the current collector is an aluminum foil current collector; a solids content of the lithium ion battery positive electrode slurry is 45 wt %, and a viscosity of the lithium ion battery positive electrode slurry is 3000 mPa·s.

NMC and the conductive agent were mixed and stirred until uniform dispersion; then the transparent solution prepared in embodiment 7 was added into the mixture as a water-based binder, stirred well, and a proper quantity of water was added to adjust the viscosity, so as to obtain an NMC electrode slurry; the slurry was coated onto an aluminum foil which was then vacuum-dried at 90° C. so as to obtain the NMC positive electrode. The vacuum-dried electrode was cut and weighed, and then installed into a 2025 battery case, with a lithium sheet as the counter electrode, a polyethylene film as the separator and 1 M $LiPF_6$ EC/DMC/DEC (v/v/v=1/1) as the electrolyte, to assemble a battery which was then subjected to an electrochemical performance test.

2. Electrochemical Test

An electrochemical test was performed on the test electrodes to determine the rate performance.

3. Result Analysis

Figure 13:
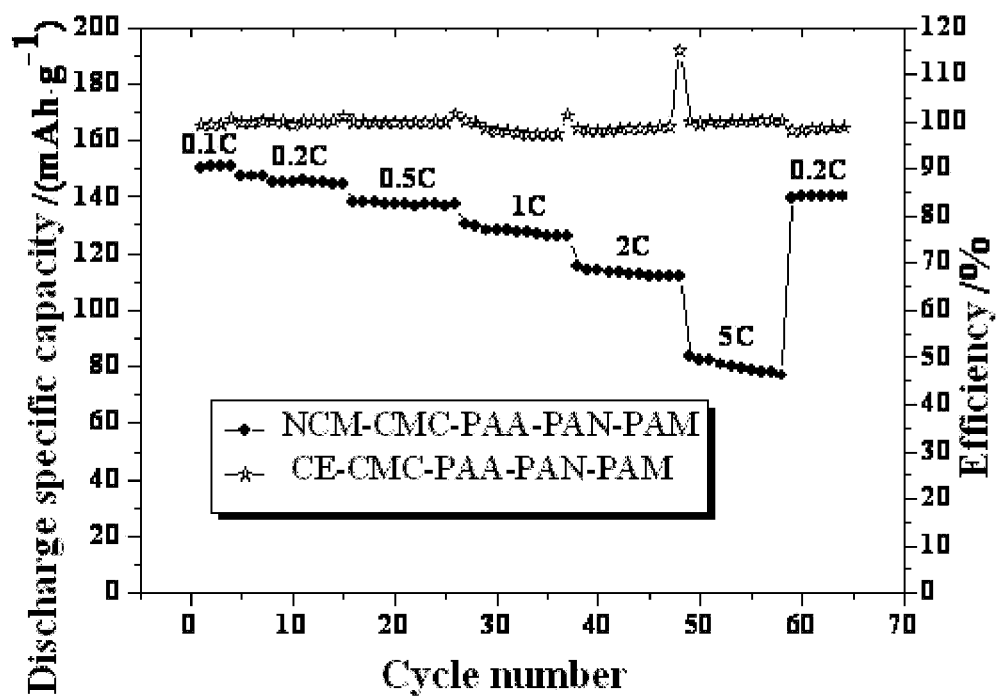
FIG. 13 shows charging and discharging curves of a ternary material and a comparative electrode as disclosed in embodiment 25 at various rates.

FIG. 13 shows charging and discharging curves of the test electrode of the present embodiment at various rates (0.1C-0.2C-0.5C-1C-2C-5C-0.2C). As can be seen from the figure, the NMC electrode, which was prepared with the multi-functionally modified polymer binder CMC-PAA-PAA-PAM, exhibited a high rate performance. The electrode showed a discharging specific capacity of 80.8 mAh/g at a rate of 5C; after charging and discharging at a high rate (5C), the capacity at a rate of 0.2C did not decrease much but remains almost the same, indicating that the NMC electrode with the CMC-PAA-PAN-PAM binder exhibited lower polarization and excellent high rate performance.

Embodiment 26

Graphite was used as a negative electrode material, and the white emulsion as prepared in embodiment 10 was used as the water-based binder.

1. Preparation of Test Electrodes

As an example of the lithium ion battery negative electrode of the present invention, the lithium ion battery negative electrode comprises a current collector and a lithium ion battery negative electrode slurry supported on the current collector; the lithium ion battery negative electrode slurry comprises a negative electrode active material, a conductive agent, the white emulsion prepared in embodiment 10 (as the binder), and a solvent; a weight ratio of the negative electrode active material, the conductive agent and the binder is 90:5:5; the solvent is water. The negative electrode active material is graphite; the conductive agent is acetylene black; the current collector is a copper foil current collector; a solids content of the lithium ion battery negative electrode slurry is 45 wt %, and a viscosity of the lithium ion battery negative electrode slurry is 3000 mPa·s.

Graphite and the conductive agent were mixed and stirred until uniform dispersion; then the white emulsion prepared in embodiment 10 was added into the mixture as a water-based binder, stirred well, and a proper quantity of water was added to adjust the viscosity, so as to obtain a graphite electrode slurry; the slurry was coated onto a copper foil which was then vacuum-dried at 60° C. so as to obtain the graphite negative electrode. The vacuum-dried electrode was cut and weighed, and then installed into a 2025 battery case, with a lithium sheet as the counter electrode, a polyethylene film as the separator and 1 M $LiPF_6$ EC/DMC/DEC (v/v/v=1/1) as the electrolyte, to assemble a battery which was then subjected to a constant current charge-discharge test.

2. Electrochemical Test

An electrochemical test was performed on the test electrodes to determine the charging and discharging performances.

3. Result Analysis

Figure 14:
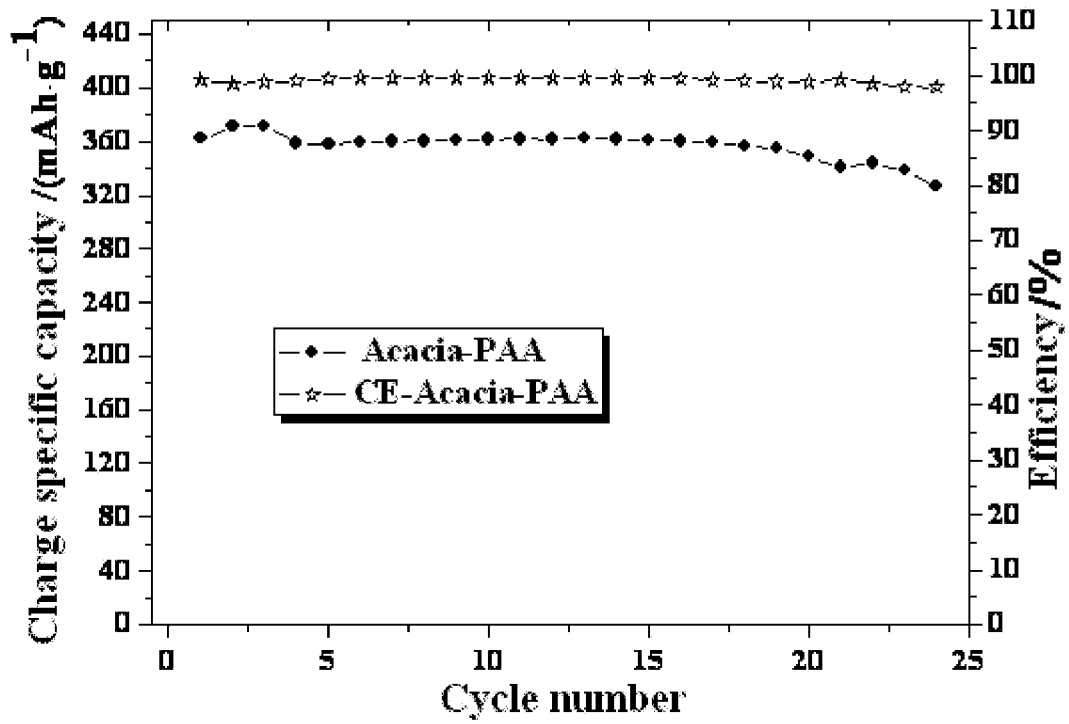
FIG. 14 shows charging and discharging curves of a graphite negative electrode material of embodiment 26 at a rate of 0.2C.

FIG. 14 shows charging and discharging curves of the test electrode of the present embodiment at a rate of 0.2C. As can be seen from the figure, the graphite electrode which was prepared with the multi-functionally modified polymer (Acacia-PAA) binder, exhibited excellent cyclic performance and had an initial coulombic efficiency of up to 99.18%. Compared with the binder system with polyvinyl alcohol as the binder and comprising polystyrene (CN 105261759A), the electrode of the present embodiment showed a higher initial coulombic efficiency. After 24 charging-discharging cycles, the electrode still exhibited a charging specific capacity of 326 mAh/g and a coulombic efficiency of 97.93%, indicating that it had excellent cyclic performance and electrochemical stability.

Embodiment 27

A silicone-based material was used as a negative electrode material, and the white emulsion as prepared in embodiment 10 was used as the water-based binder.

1. Preparation of Test Electrodes

As an example of the lithium ion battery negative electrode of the present invention, the lithium ion battery negative electrode comprises a current collector and a lithium ion battery negative electrode slurry supported on the current collector; the lithium ion battery negative electrode slurry comprises a negative electrode active material, a conductive agent, the white emulsion prepared in embodiment 10 (as the binder), and a solvent; a weight ratio of the negative electrode active material, the conductive agent and the binder is 70:20:10; the solvent is water. The negative electrode active material is a silicone-based material; the conductive agent is acetylene black; the current collector is a copper foil current collector; a solids content of the lithium ion battery negative electrode slurry is 45 wt %, and a viscosity of the lithium ion battery negative electrode slurry is 3000 mPa·s.

The silicone-based material and the conductive agent were mixed and stirred until uniform dispersion; then the white emulsion prepared in embodiment 10 was added into the mixture as a water-based binder, stirred well, and a proper quantity of water was added to adjust the viscosity, so as to obtain a Silicone-based electrode slurry; the slurry was coated onto a copper foil which was then vacuum-dried at 60° C. so as to obtain the silicone-based negative electrode. The vacuum-dried electrode was cut and weighed, and then installed into a 2025 battery case, with a lithium sheet as the counter electrode, a polyethylene film as the separator and 1 M $LiPF_6$ EC/DMC/DEC (v/v/v=1/1) as the electrolyte, to assemble a battery which was then subjected to a constant current charge-discharge test.

2. Preparation of Comparative Electrodes

The comparative electrodes were prepared by the same method wherein CMC and the modified marine polysaccharide polymer CTS-PAA-PAN of comparative example 1 were used as the binders.

3. Electrochemical Test

An electrochemical test was performed on the test electrode and the comparative electrodes to determine the charging and discharging cyclic stability.

4. Result Analysis

Figure 15:
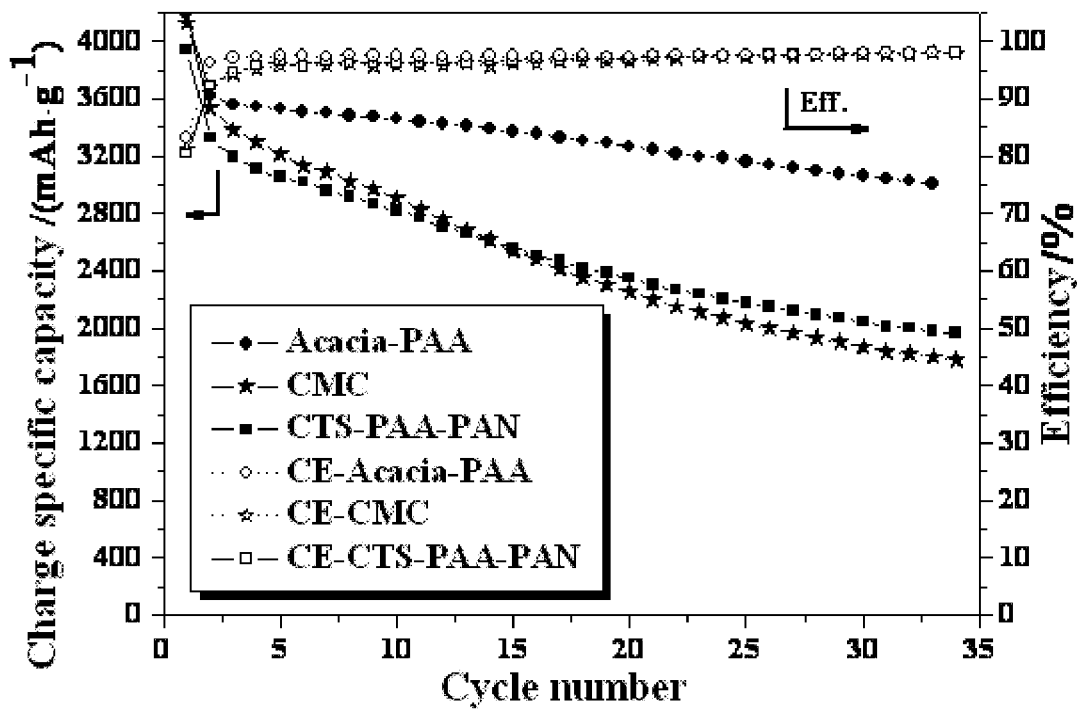
FIG. 15 shows charging and discharging curves of a silicon-based material and a comparative electrode as disclosed in embodiment 7 at a current density of 400 mA/g.

FIG. 15 shows cyclic performance test curves of the test electrode and the comparative electrodes at a charging and discharging current density of 400 mA/g, and table 4 shows a comparison between the initial coulombic efficiencies and the coulombic efficiencies of the $33^{th}$ cycle. As can be seen from the table, the Silicone-based negative electrode, which was prepared with the multi-functionally modified polymer (Acacia-PAA) binder, showed initial charge-discharge efficiency and charging specific capacity higher than those of the CMC system and the CTS-PAA-PAN system, up to 83.2% and 4195 mAh/g, exhibiting excellent electrochemical performance. After 33 charging-discharging cycles, the binder showed a charging specific capacity much higher than those of the CMC system and the CTS-PAA-PAN system, and a coulombic efficiency higher than those of the CMC system and the CTS-PAA-PAN system, exhibiting excellent electrochemical performance. It is indicated that, Acacia-PAA could not only enhance the binding strength between the electrode active material, the conductive agent and the current collector, but also greatly increase the cyclic stability and ion conduction rate of the silicone-based material, and thereby it could effectively extend battery life.

See table 4 for a comparison of the silicone-based negative materials with different binders in the coulombic efficiencies at a current density of 400 mA/g.

TABLE 4

| Binder | Initial coulombic efficiency (%) | $33^{th}$ coulombic efficiency (%) |
|---|---|---|
| E10 | 83.2 | 98.1 |
| CMC | 81.3 | 98.0 |
| C1 | 80.4 | 97.9 |

Embodiment 28

Electrodes were prepared, with graphite or a silicone-based material as the negative electrode material, lithium iron phosphate as the positive electrode material, and the glue solution prepared in embodiment 6, 7 or 10 (CMC-PAA-PAN, CMC-PAA-PAN-PAM, and Acacia-PAA) as the water-based binder. Peel strengths of different electrodes were measured.

1. Preparation of Test Electrodes

The graphite electrode was prepared according to embodiment 26. The silicone-based electrode was prepared according to embodiment 27. The LFP-based electrode was prepared according to embodiment 22.

2. Preparation of Comparative Electrodes

The comparative electrodes were prepared by the same method wherein CMC, PVDF and CTS-PAA-PAN were used as the binders.

3. Peel Strength Measurement

A peel strength measurement was performed on the test electrodes and the comparative electrodes.

4. Result Analysis

Figure 9:
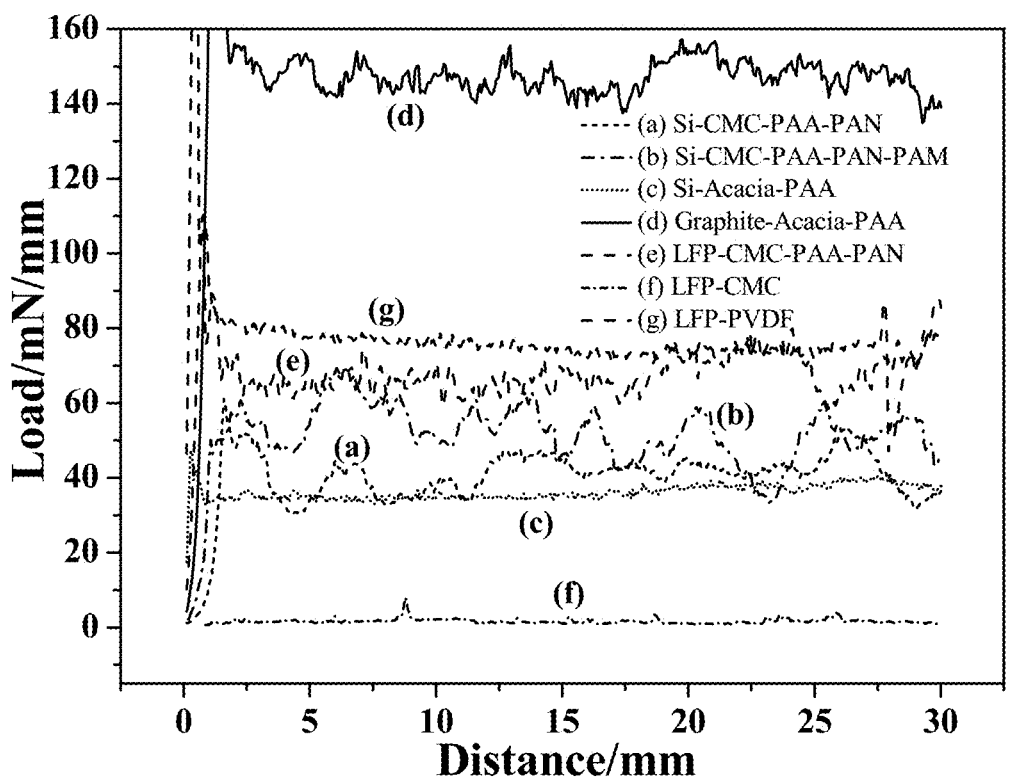
FIG. 9 shows a comparison of the multi-functionally modified polymer binders of embodiments 6, 7 and 10 in peel strength towards various electrode materials (positive electrode: LFP; negative electrode: Si and graphite). Coating thickness parameters: 100 µm for positive electrode-LFP, 80 µm for negative electrode-Si, and 50 µm for graphite.

Table 5 (FIG. 9) shows the comparison between the test electrodes (with the binders in embodiments 6, 7 and 10) and the comparative electrodes (with PVDF, CMC and CTS-PAA-PAN as the binders) in the peel strength. As can be seen from the table, the lithium iron phosphate positive electrode with the multi-functionally modified polymer binder CMC-PAA-PAN, exhibited a peel strength higher than those of the CMC and the CTS-PAA-PAN systems (about 33 times higher) and compare favorably to that of the PVDF system, suggesting promising application and development potential. The graphite negative electrode with the multi-functionally modified polymer binder Acacia-PAA, exhibited a relatively high peel strength, which is about 20 times higher than those of the binder system with polyvinyl alcohol as the binder and comprising polystyrene (CN 105261759A). In addition, the silicone-based negative electrodes with the multi-functionally modified polymer binders CMC-PAA-PAN, CMC-PAA-PAN-PAM and Acacia-PAA, exhibited relatively high peel strengths and binding strengths which prevents the materials from break off during charging and discharging and thereby improves the cyclic stability of the battery. The multi-functionally modified polymer binders of the present invention exhibit excellent water-solubility, enhance the binding strength between the electrode active materials, the conductive agents and the current collector, and improve the overall performances of the binders.

TABLE 5

| Electrode | Binder | Average peel strength (mN/mm) |
|---|---|---|
| Nano silicone powder | CMC-PAA-PAN | 39 |
| Nano silicone powder | CMC-PAA-PAN-PAM | 52 |
| Nano silicone powder | Acacia-PAA | 35 |
| Graphite | Acacia-PAA | 141 |
| Lithium iron phosphate | CMC-PAA-PAN | 66 |
| Lithium iron phosphate | CMC | 2 |
| Lithium iron phosphate | PVDF | 75 |
| Lithium iron phosphate | CTS-PAA-PAN | 2 |

The average peel strength in table 5 was determined by the following steps. Preparing an electrode comprising the binder by coating an aluminum foil (positive electrode) or a copper foil (negative electrode) with a thickness of 80 μm for nano silicone powder (copper foil substrate), 50 μm for graphite (copper foil substrate) and 100 μm for lithium iron phosphate (aluminum foil substrate). Measuring the peel strength by cutting the electrode to obtain a segment having a width of 15 mm, and performing a measurement on the segment using a peel strength testing device (Shenzhen, Kaiqiangli, 180° peel tester) with a peeling rate of 20 mm/min. The results are listed in a table.

Embodiment 29

Electrodes were prepared, with graphite or a silicone-based material as the negative electrode material, lithium iron phosphate or a ternary material as the positive electrode material, and the binder CMC-PAA-PAN or Acacia-PAA prepared in embodiment 6 or 10 as the binder. Comparative electrodes were prepared with CTS-PAA-PAN of embodiment 1 as the binders. Flatness of the electrodes were observed for comparison.

1. Preparation of Test Electrodes

The graphite electrode was prepared according to embodiment 26.

The silicone-based electrode was prepared according to embodiment 27.

The LFP-based electrode was prepared according to embodiment 22.

The NCM electrode was prepared according to embodiment 24.

2. Electrode Flatness Test

Flatness of the electrodes were observed for comparison.

3. Result Analysis

Figure 16:
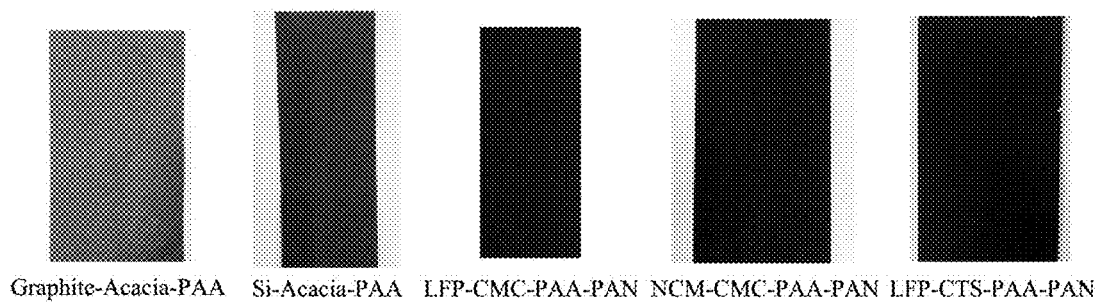
FIG. 16 shows a comparison in coating flatness of the binders of embodiments 6, 7 and 10 and comparative example 1 with various electrode materials (positive electrode: LFP; negative electrode: Si and graphite).

FIG. 16 shows a comparison in flatness of the electrodes of the present embodiment. As can be seen from the figure, the graphite and silicone-based negative electrodes with the multi-functionally modified polymer binder Acacia-PAA, and the lithium iron phosphate and ternary material positive electrodes with the multi-functionally modified polymer binder CMC-PAA-PAN, all exhibited uniform and excellent flatness, which can improve the cyclic stability of the battery, suggesting promising application and development potentials. In addition, the lithium iron phosphate electrode with CMC-PAA-PAN showed uniformity and flatness better than those of the CTS-PAA-PAN system, without graininess or discontinuity, which can improve the electrochemical stability of the battery during charging and discharging and thereby extend battery life.

What is claimed is:

1. A multi-functionally modified polymer binder for lithium ion batteries, wherein the multi-functionally modified polymer binder is prepared by a Michael addition reaction, with a biomass polymer or a synthetic polymer as a substrate, and with a hydrophilic monomer and a lipophilic monomer as functionally modifying monomers; the biomass polymer is one or more selected from the group consisting of arabic gum, cyclodextrin, cellulose derivative, xanthan gum, pectin, gelatin, starch, and sesbania gum; the synthetic polymer is one or more selected from the group consisting of polyethyleneimine, polyethylene glycol and polyhydroxy polybutadiene; the hydrophilic monomer is at least one of monomers having a structure of $CH_2=CR_1R_2$, wherein $R_1$ is selected from the group consisting of —H, —$CH_3$ and —$CH_2CH_3$, and $R_2$ is selected from the group consisting of —COOH, —COOM and —$CONH_2$, wherein M is selected from Li, Na or K; the lipophilic monomer is at least one of monomers having a structure of $CH_2=CR_3R_4$, wherein $R_3$ is selected from the group consisting of —H, —$CH_3$ and —$CH_2CH_3$, and $R_4$ is at least one selected from the group consisting of —CN, —$OCOCH_3$, —$CONHCH_3$, —$CON(CH_3)_2$, —$CH=CH_2$, -Ph-$R_5$ and —$COOR_6$, wherein $R_5$ is —H or any substituent other than —H, and $R_6$ is selected from at least one of C1-C8 alkyl groups; a weight ratio of the biomass polymer or the synthetic polymer, the hydrophilic monomer and the lipophilic monomer is 1:0-100:0-100; wherein the Michael addition reaction is performed with one or more of the hydrophilic monomers and the lipophilic monomers and catalyzed by a base catalyst; an amount of the base catalyst is 0.01-5 wt % of a total weight of the hydrophilic monomers and the lipophilic monomers.

2. The multi-functionally modified polymer binder according to claim 1, wherein the weight ratio of the biomass polymer or the synthetic polymer, the hydrophilic monomer and the lipophilic monomer is 1:0.01-20:0.01-20.

3. The multi-functionally modified polymer binder according to claim 1, wherein the cellulose derivative is one or more selected from the group consisting of sodium carboxymethyl cellulose, sodium hydroxyethyl cellulose, and hydroxypropyl methylcellulose.

4. A lithium ion battery, comprising a battery case, an electrode core and an electrolyte, wherein the electrode core and the electrolyte are sealed in the battery case, the electrode core contains electrodes and a separator between the electrodes, and the electrodes comprise the multi-functionally modified polymer binder of claim 1.

5. A preparation method of the multi-functionally modified polymer binder according to claim 1, comprising the following steps:
   (1) dissolving the biomass polymer or the synthetic polymer in deionized water, and thoroughly stirring under a protective gas atmosphere for 0.5-2.5 hours to remove oxygen and obtain a solution; a stirring rate is 100-500 rpm;
   (2) adding the base catalyst to the solution obtained in step (1), thoroughly stirring to obtain a mixing solution; adding the hydrophilic monomer and the lipophilic monomer to the mixing solution; and stirring to allow reaction at 40-90° C. for 1-4 hours to obtain the multi-functionally modified polymer binder, wherein water-solubility and oil-solubility of the multi-functionally modified polymer binder is regulated by adjusting a mass ratio of the hydrophilic monomer and the lipophilic monomer; an amount of the base catalyst is 0.01-5 wt % of the total weight of the hydrophilic monomers and the lipophilic monomers; a weight ratio of the biomass polymer or the synthetic polymer, the hydrophilic monomer and the lipophilic monomer is 1:0-100:0-100; the base catalyst is selected from one or more of LiOH, NaOH, LiOH/carbamide and NaOH/carbamide.

* * * * *